United States Patent [19]

Nakamura et al.

[11] Patent Number: 5,978,323
[45] Date of Patent: Nov. 2, 1999

[54] DISK CHANGER APPARATUS HAVING A DISK RECEIVING UNIT OPERATIVELY INTERLOCKED WITH A FRONT PANEL

[75] Inventors: Masahiko Nakamura, Yao; Yukio Morioka, Katano; Noriyosi Ohtaki, Yawata; Katsuhiko Koshino, Neyagawa, all of Japan

[73] Assignee: Matsushita Electric Industrial Co., Ltd., Osaka-Fu, Japan

[21] Appl. No.: 08/713,688

[22] Filed: Sep. 17, 1996

[30] Foreign Application Priority Data

Sep. 22, 1995 [JP] Japan .................................. 7-244956

[51] Int. Cl.⁶ .................................................. G11B 17/22
[52] U.S. Cl. ..................................................... 369/36
[58] Field of Search ............................... 369/36, 178, 191, 369/192, 38

[56] References Cited

U.S. PATENT DOCUMENTS 4,589,101  5/1986  Schatteman et al. ................... 369/36
4,599,716  7/1986  Shimbo .................................... 369/36
4,633,452  12/1986  Shimbo et al. .......................... 369/39
4,695,990  9/1987  Kawakami ............................... 369/36
5,754,519  5/1998  Bando .................................... 369/192

FOREIGN PATENT DOCUMENTS 6-34290  5/1994  Japan .

*Primary Examiner*—George J. Letscher
*Attorney, Agent, or Firm*—Akin, Gump, Strauss, Hauer & Feld, L.L.P.

[57] ABSTRACT

A disk changer apparatus for selectively reproducing a plurality of disks, the disk changer including a disk delivery unit arranged on the front of a stocker tray for holding a plurality of disks and adapted to move along the direction in which the disks are arranged on the front of the stocker tray. By depressing an eject button providing an operating unit for the disk delivery unit, a push-up lever advances into the stocker tray from a bottom opening of the stocker tray. As a result, a disk held in the stocker tray is taken out forward of the stocker tray by the rotation of the push-up lever, and is retained by a disk receiving lever of the disk delivery unit.

3 Claims, 19 Drawing Sheets

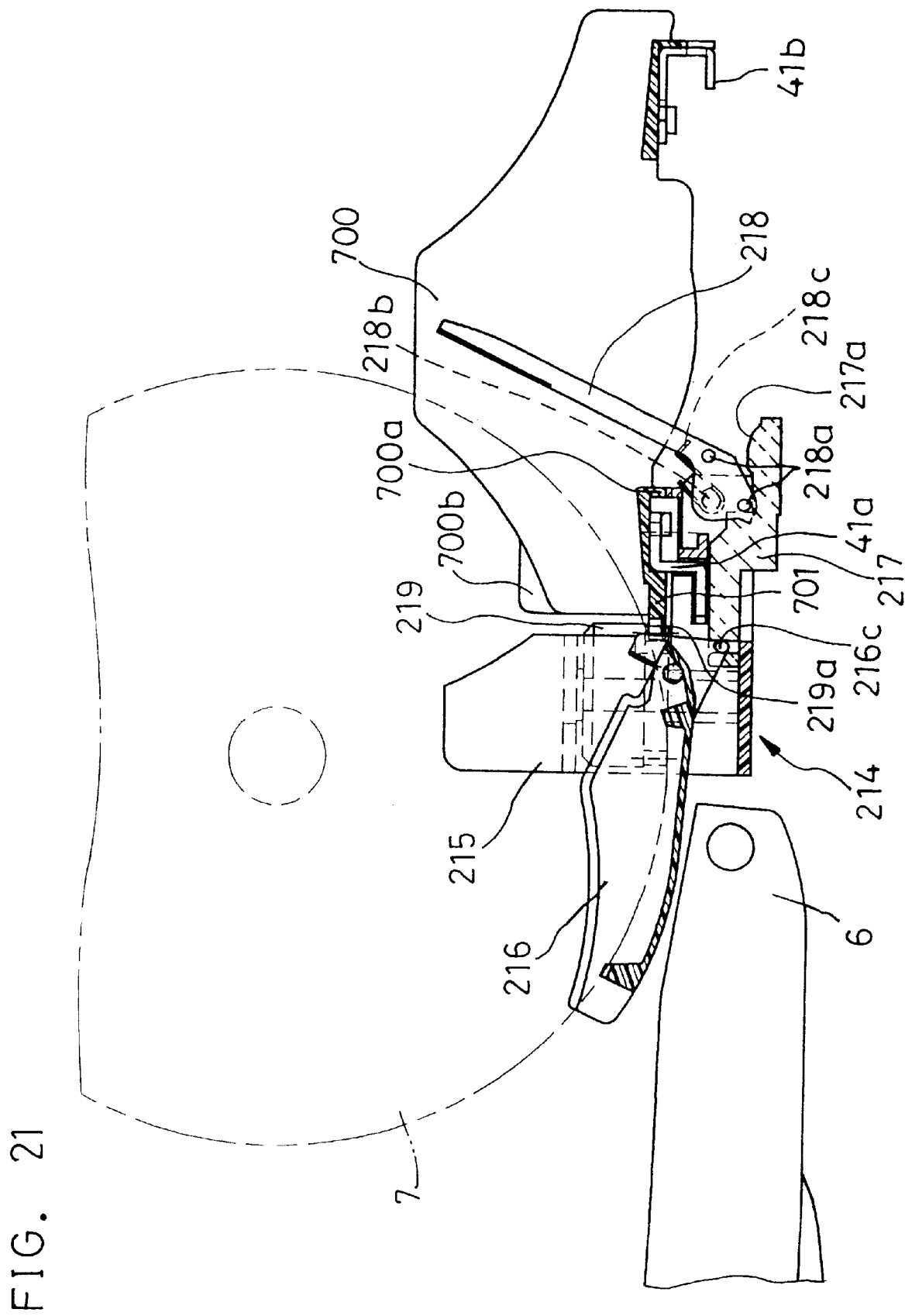

DISK CHANGER APPARATUS HAVING A DISK RECEIVING UNIT OPERATIVELY INTERLOCKED WITH A FRONT PANEL

FIELD OF THE INVENTION AND RELATED ART STATEMENT

1. Field of the Invention

The present invention relates to a disk changer apparatus for holding a plurality of disks and reproducing selected disks sequentially and continuously.

2. Description of the Related Art

In recent years, a disk changer apparatus capable of selectively reproducing a given one of a plurality of disks held in the apparatus has been spread widely with the spread of use of disks such as the compact disk.

Especially, a disk changer apparatus is under development, in which a plurality of disks are arranged upright or horizontally in layers at predetermined spatial intervals. In this way, at least 50 disks can be held in an apparatus of about the same size as the conventional cassette deck. Such a disk changer apparatus has such a superior holding capacity and operability that the use thereof has extended widely and rapidly among general users.

An example of such a conventional disk changer apparatus is disclosed in the gazette of the Japanese examined patent application hei 6-34290 (Tokko hei 6-34290).

This conventional disk changer apparatus comprises a holding tray unit for holding a plurality of disks removably on the front thereof. Also, a disk drive unit having a reproduction unit for reproducing the disks is arranged backward of the holding tray unit (in the depth of the apparatus) and is movable along the direction in which the disks are arranged.

In this conventional disk changer apparatus, when a disk is held or a held disk is exchanged, the holding tray unit is removed entirely from the apparatus proper beforehand.

In the conventional disk changer apparatus described above, even in the case that only one of the disks held therein is exchanged, the whole of the holding tray unit is required to be removed from the apparatus and therefore the operation for exchanging the disks is very burdensome.

Another problem of the above-mentioned conventional disk changer apparatus is that in the case where a specific disk is to be taken out from the holding tray unit holding a substantially maximum number of disks, it is not easy to confirm the position of the disk to be taken out.

Further, even when the position of the disk to be taken out can be confirmed, it is very difficult to pick up only the desired one of the disks held in the apparatus because of the close spatial relation with adjacent disks. Especially in the case where a small disk of 8 cm in outer diameter is held between large disks 12 cm in outer diameter like ordinary compact disks, it is very difficult to take out the small disk. This problem has yet to be solved in this particular field.

OBJECT AND SUMMARY OF THE INVENTION

A disk changer apparatus of the present invention has been developed in order to solve the above-mentioned problems, and the object thereof is to provide a small disk changer apparatus with a simple construction, in which the disks held therein can be easily exchanged and a disk of any shape can be easily taken out from a multiplicity of disks closely held with each other.

In order to achieve the above-mentioned object, according to one aspect of the invention, there is provided a disk changer apparatus comprising: a stocker tray including a plurality of partitioning plates arranged substantially in parallel at predetermined spatial intervals and a plurality of couplers each having an opening at least in a part of the bottom thereof for coupling the partitioning plates, the stocker tray holding disks one each between every adjacent partitioning plates; and a disk delivery unit including a push-up lever and an operating means for driving the push-up lever, the push-up lever being adapted to advance into a partition between every adjacent partitioning plates from the opening formed in the coupler of the stocker tray and take a disk from the stocker tray to outside the apparatus, the disk delivery unit being movable along the direction in which the disks are arranged.

According to another aspect of the invention, there is provided a disk changer apparatus comprising: a stocker tray including a plurality of partitioning plates arranged substantially in parallel at predetermined spatial intervals and a plurality of couplers each having an opening in at least a part of the bottom thereof for coupling the partitioning plates, the stocker tray holding a plurality of disks each between adjacent ones of the partitioning plates; a reproduction (playback) unit movable along the direction of disk arrangement in the stock tray for selectively reproducing a plurality of disks held in the stocker tray; and a disk delivery unit including a push-up lever adapted to advance into a partition between every adjacent partitioning plates from the opening formed in the coupler of the stocker tray and taking a given disk from the stocker tray to outside the apparatus and an eject lever for taking out a given disk from the stocker tray by rotating the push-up lever and retaining the disk thus taken out, the disk delivery unit being movable along the direction in which the disks are arranged in the stocker tray.

According to still another aspect of the invention, there is provided a disk changer apparatus so configured that the disk delivery unit is moved to the position of the desired disk held in the stocker tray and the operating unit is pushed. This simple operation permits the disk push-up lever to advance into a partition between adjacent partitioning plates and positively pick up the desired disk alone. For this reason, in the case where a plurality of disks are closely held in the stocker tray or in the case where it is desired to take out a small disk from between large disks, the desired disk can be easily and accurately taken out or exchanged without touching the remaining disks.

According to a further aspect of the invention, there is provided a disk changer apparatus small in size and simple in construction comprising a disk delivery unit arranged on the front of a disk holding unit and movable along the direction of disk arrangement for taking out a given disk from the disk holding unit. Thus the disks held in the disk holding unit can be easily taken out or exchanged. Even in the case where a multiplicity of disks are held or especially in the case where a small disk held between large disks is to be taken out, the desired disk can be easily and accurately taken out.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 21 is a side sectional view showing the disk delivery unit with a disk delivered out of the second embodiment.

It will be recognized that some or all of the Figures are schematic representations for purposes of illustration and do not necessarily depict the actual relative sizes or locations of the elements shown.

DESCRIPTION OF THE PREFERRED EMBODIMENTS

A disk changer apparatus of the first and second embodiments in accordance with the present invention will be described below with reference to the accompanying drawings.

First Embodiment

Figure 1:
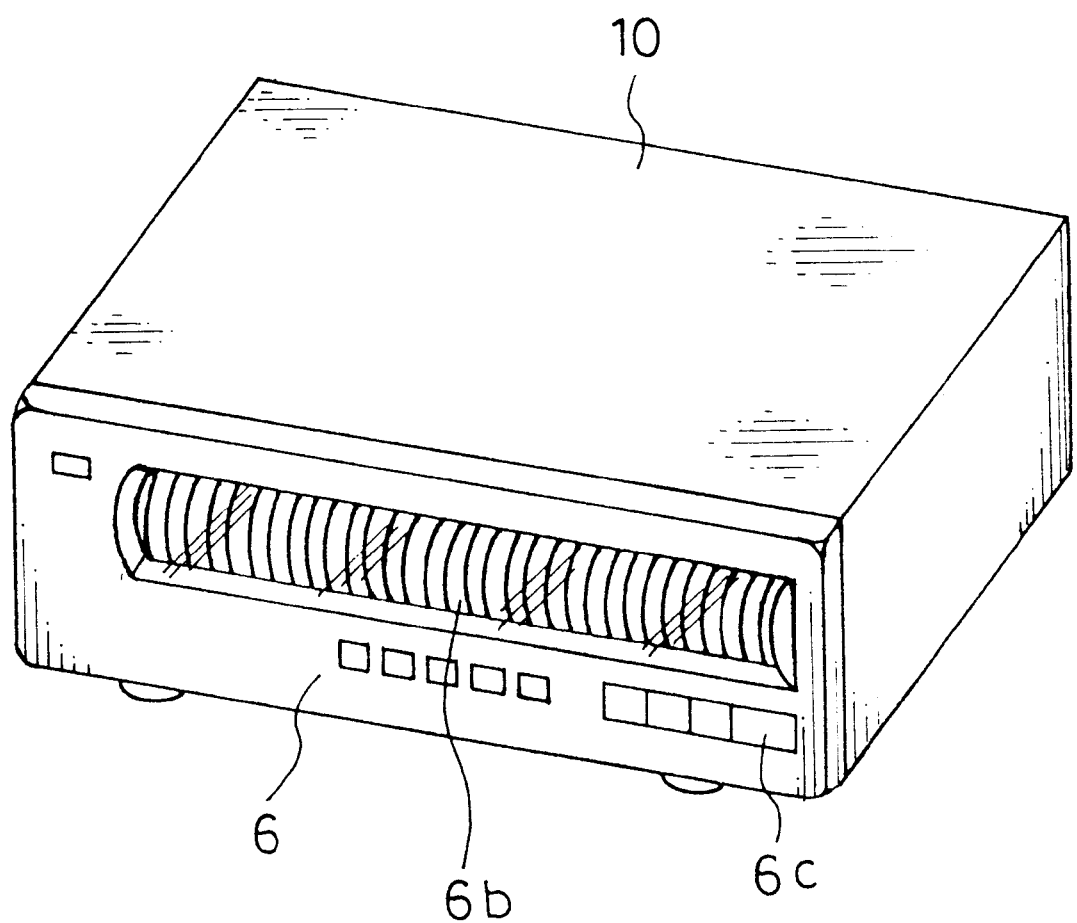
FIG. 1 is a perspective view showing the external appearance of a disk changer apparatus of a first embodiment in accordance with the present invention.
Figure 2:
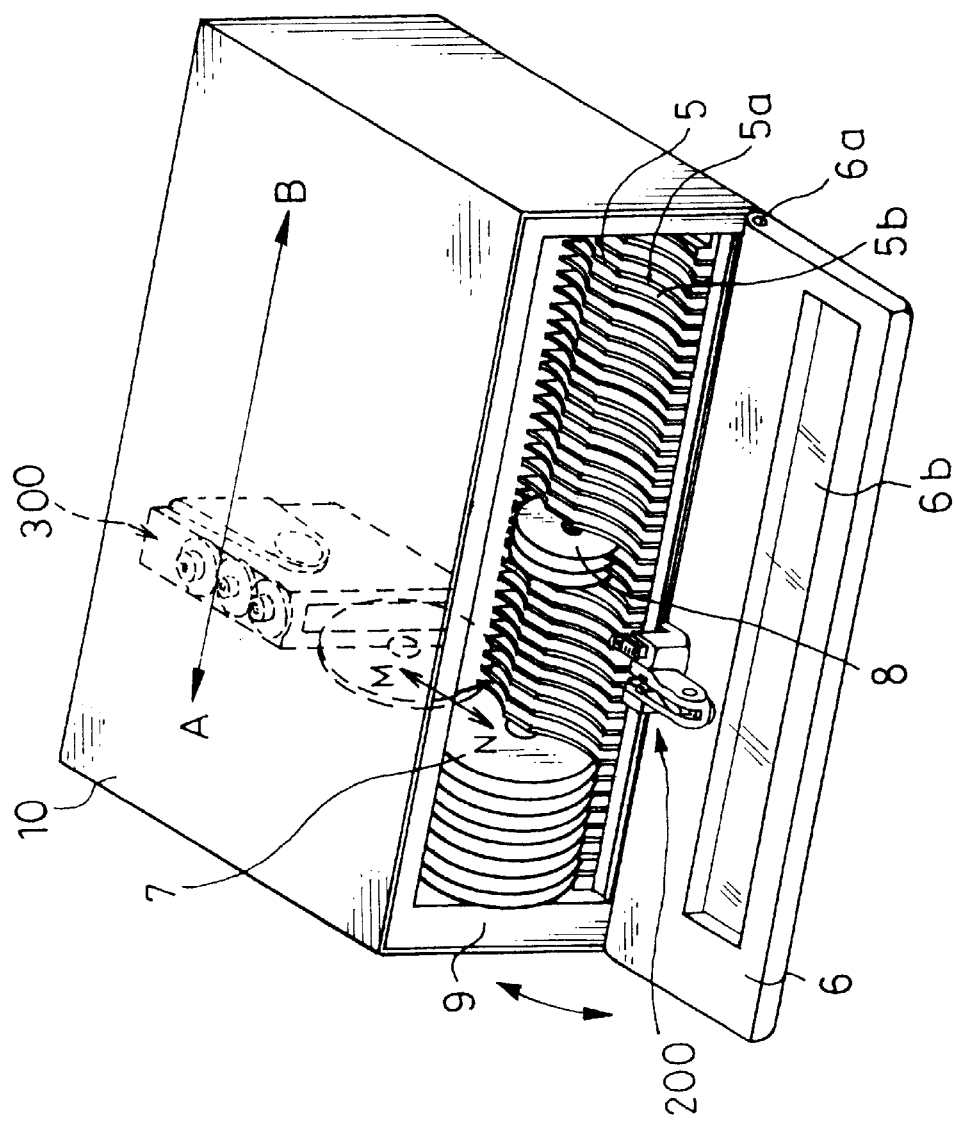
FIG. 2 is a perspective view showing the disk changer apparatus of FIG. 1 with the front panel thereof open.
Figure 3:
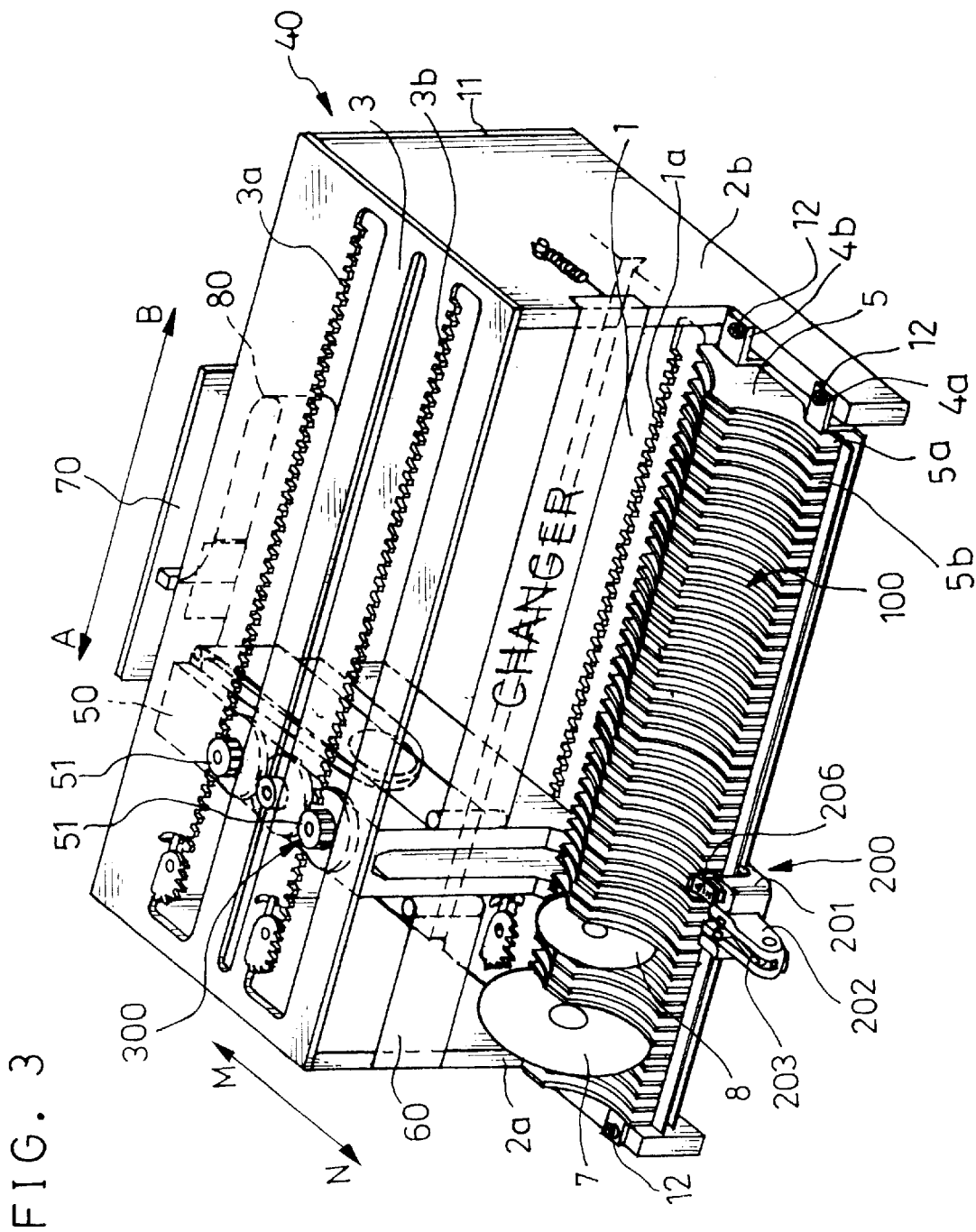
FIG. 3 is a perspective view showing the disk changer apparatus of FIG. 1 with the exterior case thereof removed.

FIG. 1 is a perspective view showing the external appearance of a disk changer apparatus of the first embodiment. FIG. 2 is a perspective view showing the disk changer apparatus of which a front panel 6 thereof is open. FIG. 3 is a perspective view showing the internal mechanism of the disk changer apparatus of which an exterior case 10 constituting the external appearance is removed.

As shown in FIGS. 1 and 2, the disk changer apparatus of the first embodiment is configured to hold a plurality of large disks 7 (12 cm in diameter) and small disks 8 (8 cm in diameter) arranged in upright positions in predetermined spatial relation with each other in the vicinity of the front of the exterior case 10. In the first embodiment, the large disk 7 and the small disk 8 are collectively called the disk(s) 7, 8.

The exterior case 10 is mounted on a chassis 9 of which the front is open. The front panel 6 is arranged on the front surface of the chassis 9. The front panel 6 is mounted rotatably about a fulcrum 6a. The disks 7, 8 are taken out or exchanged by opening and closing the front panel 6.

As shown in FIGS. 1 and 2, the front panel 6 of the disk changer apparatus of the first embodiment has a transparent window 6b. Even when the front panel 6 is closed, the presence or absence of the disks 7, 8 held in the apparatus can be checked visually through the transparent window 6b. Also, as shown in FIG. 1, a plurality of operating switches 6c are provided on the front of the front panel 6 for driving the disk changer apparatus of the first embodiment.

FIG. 3 shows the internal mechanism arranged in the chassis 9. As shown in FIG. 3, the disk changer apparatus of the first embodiment comprises a frame unit 40 including a lower rack plate 1, a left side plate 2a, a right side plate 2b, an upper rack plate 3 and a rear reinforcing plate 11. This frame unit 40 is a substantially box-shaped of which the front is open. The upper rack plate 3 is formed with a first rack 3a and a second rack 3b in parallel to the direction in which the disks 7, 8 are arranged (along the direction of arrows A and B in FIG. 3). The lower rack plate 1, on the other hand, is formed to have a third rack 1a in parallel to the first rack 3a and the second rack 3b of the upper rack plate 3.

The rear reinforcing plate 11 is fixed on the chassis 9 thereby to secure the whole of the frame unit 40 on the chassis 9.

The teeth of the first rack 3a and the second rack 3b of the upper rack plate 3, and the third rack 1a of the lower rack plate 1 have the same pitches and the same shape in the same vertical plane.

As shown in FIG. 3, the disk changer apparatus of the first embodiment comprises a disk holding unit 100 arranged along the front surface of the apparatus for holding a plurality of disks 7, 8, a disk delivery unit 200 movable in parallel to the direction of arrangement of the disks 7, 8 on the front of the disk holding unit 100, and a disk reproduction unit 300 movable in parallel to the direction of arrangement of the disks 7, 8 in the depth of the disk holding unit 100.

Next, the configuration of the disk holding unit 100, the disk delivery unit 200 and the disk reproduction unit 300 will be explained.

[Disk holding unit 100]

As shown in FIG. 3, the disk holding unit 100 includes rests 4a, 4b hung between the protruded front portions of the left side plate 2a and the right side plate 2b, and a stocker tray 5 fixed on the rests 4a, 4b. The stocker tray 5 is held by the rests 4a, 4b fixed on the left side plate 2a and the right side plate 2b by screws 12. The stocker tray 5 has a plurality of partitioning plates 5a having a thickness of 1.5 mm positioned upright therein at spatial intervals of 3 mm, so that the disks 7, 8 are adapted to be held respectively in holding slots 5b formed between the partitioning plates 5a.

Figure 4:
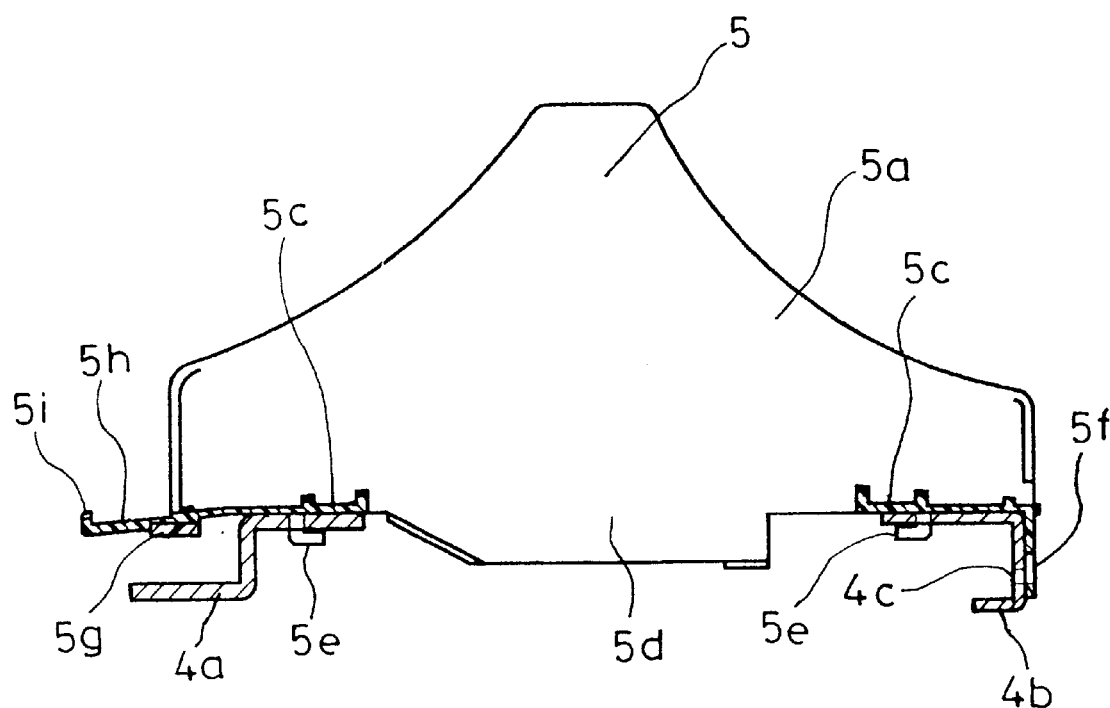
FIG. 4 is a side view showing a stocker tray, etc. of the first embodiment.

FIG. 4 is a side sectional view showing the stocker tray 5, the rests 4a, 4b, etc. In FIG. 4, couplers 5c for coupling the partitioning plates 5a are formed on the lower front and rear parts of the stocker tray 5. Also, an opening 5d is formed in the lower central part of the stocker tray 5.

Several hooks 5e are provided on the lower side of the couplers 5c of the stocker tray 5 and engage the holes formed in the rests 4a, 4b. As a result, the stocker tray 5 is fixed securely to the rests 4a, 4b. Also, slits 5f for positioning the disk reproduction unit 300 are formed in the couplers 5c in the rear part of the stocker tray 5. Positioning slits 4c are formed in the rest 4b at the same positions as the slit 5f of the coupler 5c. These positioning slits 4c, 5f are formed at 3-mm intervals in the direction in which the disks 7, 8 are arranged, and to correspond to the intervals of the disk holding slots 5b of the stocker tray 5.

Figure 5:
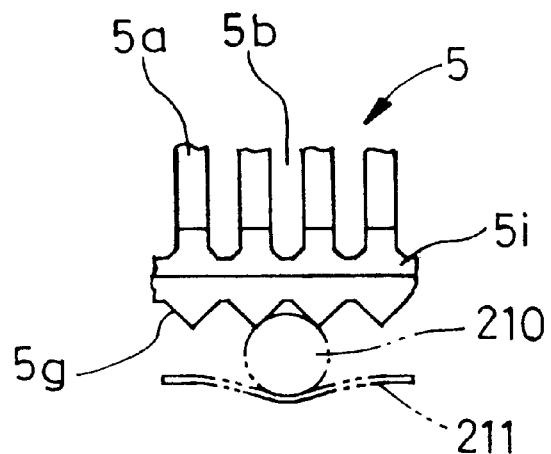
FIG. 5 is a front view showing grooves used for the positioning mechanism of the disk delivery unit of the first embodiment.

A plurality of triangular grooves 5g are formed in the lower front part of the stocker tray 5 for setting the disk delivery unit 200 exactly in position. FIG. 5 is a partially enlarged front view of the stocker tray 5. As shown in FIG. 5, the triangular grooves 5g are formed in the lower front part of the stocker tray 5 at regular spatial intervals with each other. The centers of the respective triangular grooves 5g agree with the centers of the disk holding slots 5b of the stocker tray 5, respectively. A click ball 210 described later of the disk delivery unit 200 engages with one of the triangular grooves 5g of the stocker tray 5.

The click ball 210 engaging the triangular groove 5g of the stocker tray 5 is provided for positioning the disk delivery unit 200 with precision. The click ball 210 is a steel ball 4 mm in diameter, and is kept urged in pressure contact with the triangular groove 5g by a click spring 211 (made of phosphor bronze 0.15 mm thick).

Figure 6:
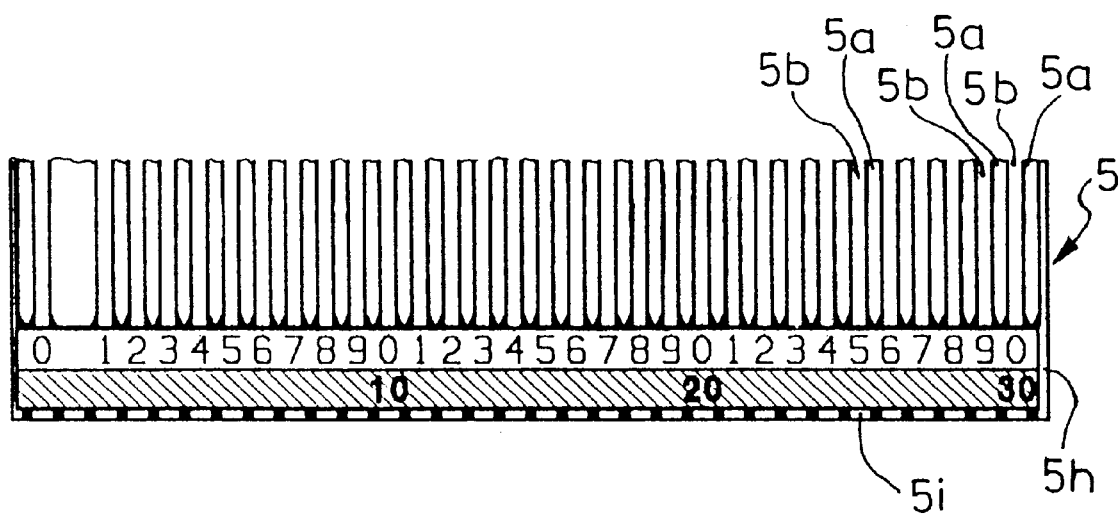
FIG. 6 is a plan view showing a number indication plate of the stocker tray of the first embodiment.

FIG. 6 is a partially enlarged plan view showing a number indication plate 5h of the stocker tray 5. As shown in FIG. 6, the number indication plate 5h is arranged on the front of the stocker tray 5. The number indication plate 5h has serial numbers attached at each position thereon corresponding to the slots 5b for holding the disks 7, 8. The numbers on the number indication plate 5h are divided into two groups of single digit and double digits classified by colors such as red and blue, respectively. These numbers are used for indicating the disk positions in the disk delivery unit 200 on the one hand, and as an aid for the user when the disk 7, 8 is directly mounted in the stocker tray 5 on the other.

As shown in FIG. 4, the front end of the number indication plate 5h is bent upward, and forms a supporting edge 5i for supporting the disk 7, 8 taken out from the stocker tray 5. This supporting edge 5i is formed to have recesses at each position corresponding to the holding slots 5b of the stocker tray 5. The edge of the disk 7, 8 taken out is supported by the recess, and the disks 7, 8 are thus prevented from being displaced.

[Disk reproduction unit 300]

As shown in FIG. 3, the disk reproduction unit 300 includes a loading unit 50 disposed in the depth of the disk holding unit 100 and movable parallel along the direction in which the disks 7, 8 are arranged. The loading unit 50 includes a loading unit drive mechanism for transporting the loading unit 50 laterally of the apparatus (along the direction of arrow A or arrow B in FIG. 3), a reproduction unit for reproducing (playing back) the disks 7, 8, a reproduction unit drive mechanism for driving the reproduction unit to a playback position from a playback wait position, and a disk transfer mechanism for transferring the disks 7, 8 between the stocker tray 5 and the reproduction unit.

The loading unit 50 is arranged at the extreme left of the upper rack plate 3 and the lower rack plate 1 in the initial state (where the disk 7, 8 is not reproduced or the disk changer apparatus of the first embodiment is during transport).

Relocation gears 51 are arranged on the upper and lower surfaces of the loading unit 50. The relocation gears 51 are in mesh with the first rack 3a, the second rack 3b and the third rack 1a. The loading unit 50 of the first embodiment is moved along the direction of arrow A or arrow B by the rotation of the relocation gears 51.

A screen belt 60 for preventing the disks 7, 8 in the stocker tray 5 from advancing into the apparatus is hung on the front of the left side plate 2a and the right side plate 2b. The left end of the screen belt 60 is fixed on the left side plate 2a, and the right end thereof is suspended on the right side plate 2b through a spring. The screen belt 60 is arranged slidably around the loading unit 50.

As shown in FIG. 3, a flexible signal wire 80 is connected between the loading unit 50 and a circuit board 70 fixed on the frame unit 40. The disk reproduction unit 300 of the first embodiment is adapted to follow the movement of the loading unit 50 along the direction of arrow A or B.

[Disk delivery unit 200]

The disk delivery unit 200 is a mechanism for taking out a designated disk 7, 8 accurately from the disks 7, 8 held in the stocker tray 5.

Figure 7:
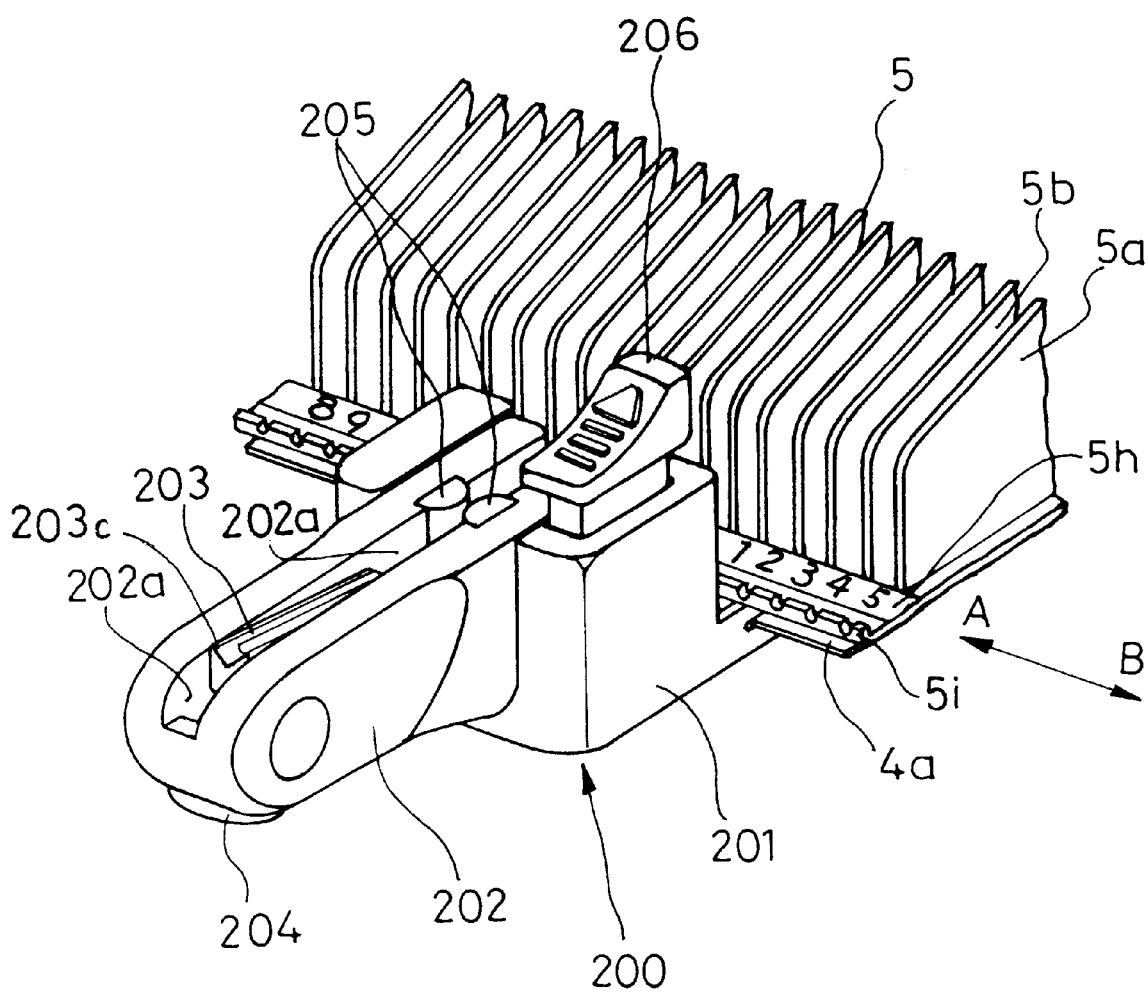
FIG. 7 is a perspective view showing the disk delivery unit of the first embodiment.

FIG. 7 is a perspective view showing the external appearance of the disk delivery unit 200 arranged on the front of the stocker tray 5.

In FIG. 7, the disk delivery unit 200 includes an eject base 201 which is in slidable mesh with the rest 4a for supporting the stocker tray 5. As a result, the disk delivery unit 200 is capable of moving slidably on the front of the stocker tray 5 along the direction of arrow A or B in which the disks 7, 8 are arranged.

An eject lever 202 providing as a disk receiving unit is projected from the eject base 201, and rotatably held on the eject base 201. The eject lever 202 has a groove 202a extending in the direction of projection at the central part thereof. A disk receiving lever 203 arranged in a groove 202a of the eject lever 202 is rotatably held on the eject lever 202. The disk receiving lever 203 is for holding the disk 7, 8 taken out from the stocker tray 5 in a delivery position.

Since the disk receiving lever 203 is arranged in the vicinity of the forward end of the eject lever 202, the disk 7, 8 held by the disk receiving lever 203 in a delivery position is projected at a position where the user can grasp the disk 7, 8 by the central portion thereof.

An eject button 206 for taking out the disk 7, 8 held in the stocker tray 5 is supported by the eject base 201 to be vertically slid.

A supporter 204 is fixed in the vicinity of the forward end of the eject lever 202 and comes into contact with the back side of the front panel 6 so as to protect the front panel 6 and reduce the contact noise generated at the time of opening or closing the front panel 6.

The eject lever 202 has a pair of disk protectors 205 for guiding while protecting the disk 7, 8 being taken out. The disk protectors 205 are fixed on the opposite internal surfaces of the groove 202a of the eject lever 202. When the disk 7, 8 to be taken out passes along the groove 202a of the eject lever 202, the disk protector 205 prevents the disk 7, 8 from being damaged by contacting the wall surface of the groove 202a. For this purpose, the disk protectors 205 are made of such a soft material as to form a smooth convex surface continuous with the wall of the groove 202a of the eject lever 202.

Apart from the above-mentioned first embodiment, wherein the soft resin is used as a soft material, a modified embodiment may be such that felt is used as a material of the disk protectors 205.

Figure 8:
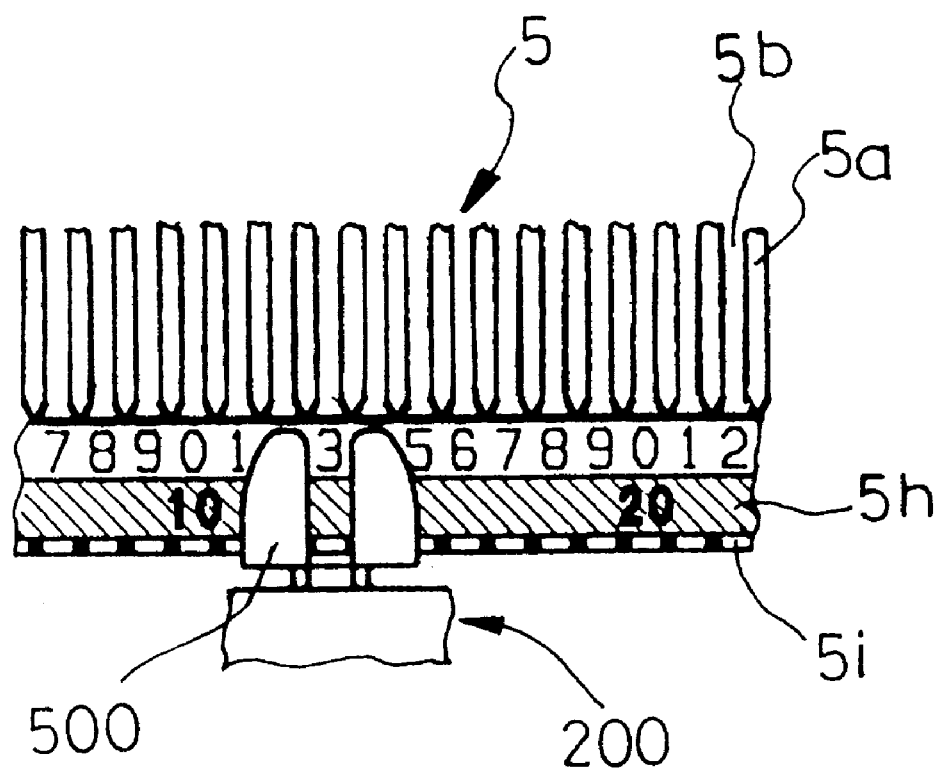
FIG. 8 is a plan view showing the position indicator of the disk delivery unit of the first embodiment.

FIG. 8 shows a position indicator 500 formed on the disk delivery unit 200. The position indicator 500 is configured of a forked portion formed on the back of the eject base 201. As shown in FIG. 8, the position indicator 500 is arranged in the vicinity of the upper part of the number indication plate 5h of the stocker tray 5 described above. The position of the disk delivery unit 200 is indicated with number by such a function of the position indicator 500 formed on the back of the eject base 201. The position indicator 500 is accurately positioned by the positioning mechanism including the triangular grooves 5g of the stocker tray 5 and the click ball 210 shown in FIG. 5.

Figure 9:
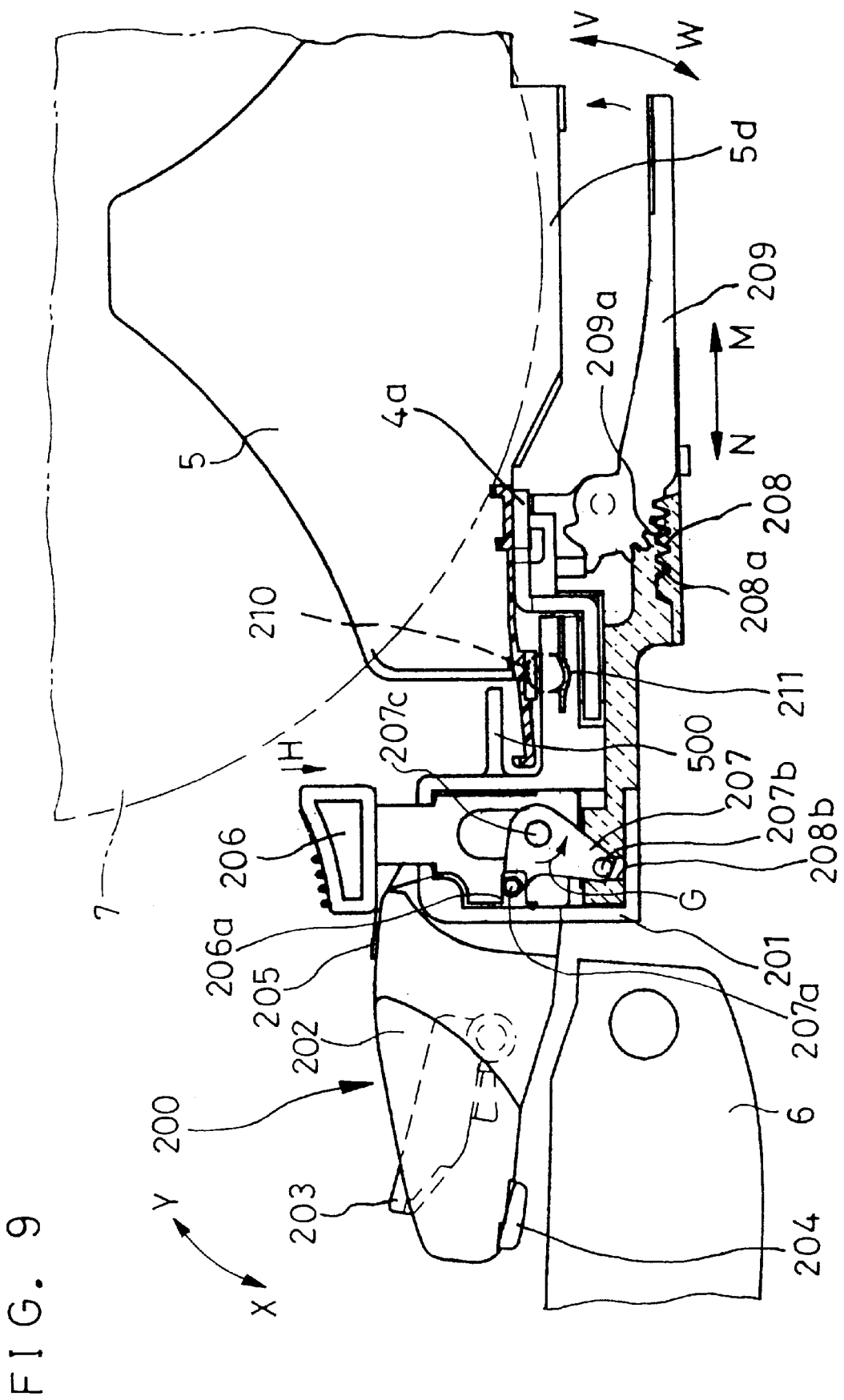
FIG. 9 is a side view showing the internal mechanism of the disk delivery unit of the first embodiment.

FIG. 9 is a side view showing the internal mechanism of the disk delivery unit 200. In FIG. 9, the eject button 206 of the disk delivery unit 200 is provided to move down along the wall surface of the eject base 201 by being hand pressed. An engaging groove 206a formed on the eject button 206 is in mesh with a first pin 207a of an intermediate lever 207. The intermediate lever 207 is constructed to rotate about the axis 207c thereof. As a consequence, the downward movement (along the direction of arrow H in FIG. 9) of the eject button 206 causes the intermediate lever 207 to rotate along the direction of arrow G. Also, the intermediate lever 207 is formed to have a second pin 207b, and an eject slide plate 208 shown hatched in FIG. 9 is formed to have an engaging groove 208b. The engaging groove 208b of the eject slide plate 208 is in mesh with the second pin 207b of the intermediate lever 207. As a result, by the rotation of the intermediate lever 207 along the direction of arrow G, the eject slide plate 208 moves rearward of the apparatus (along the direction of arrow M in FIG. 9). The eject slide plate 208 is formed to have a rack 208a at the rear end thereof. The rack 208a is in mesh with the gear teeth 209a formed on the front end of a push-up lever 209. (In FIG. 9, the eject slide plate 208 is hatched to facilitate the understanding of the engagement between the intermediate lever 207, the eject slide plate 208 and the gear teeth 209a). When the eject slide plate 208 moves along the direction of arrow M, the push-up lever 209 is rotated in the direction shown with arrow V.

The eject slide plate 208 is kept urged along the direction of arrow N by a slide return spring (SUS torsion spring) not shown. As a result, the eject button 206 is normally arranged at an upper position when the push-up lever 209 is located under the stocker tray 5.

The push-up lever 209 is made of stainless steel SUS301 CSP specified in JIS and has a thickness of 0.8 mm. The upper rear end of the push-up lever 209 is chamfered to facilitate insertion into the holding slot 5b.

The eject lever 202 shown in FIG. 9 is kept urged to rotate in the direction of arrow X by an eject lever spring (stainless steel torsion spring) wound on the rotational shaft of the eject lever 202.

Figure 10:
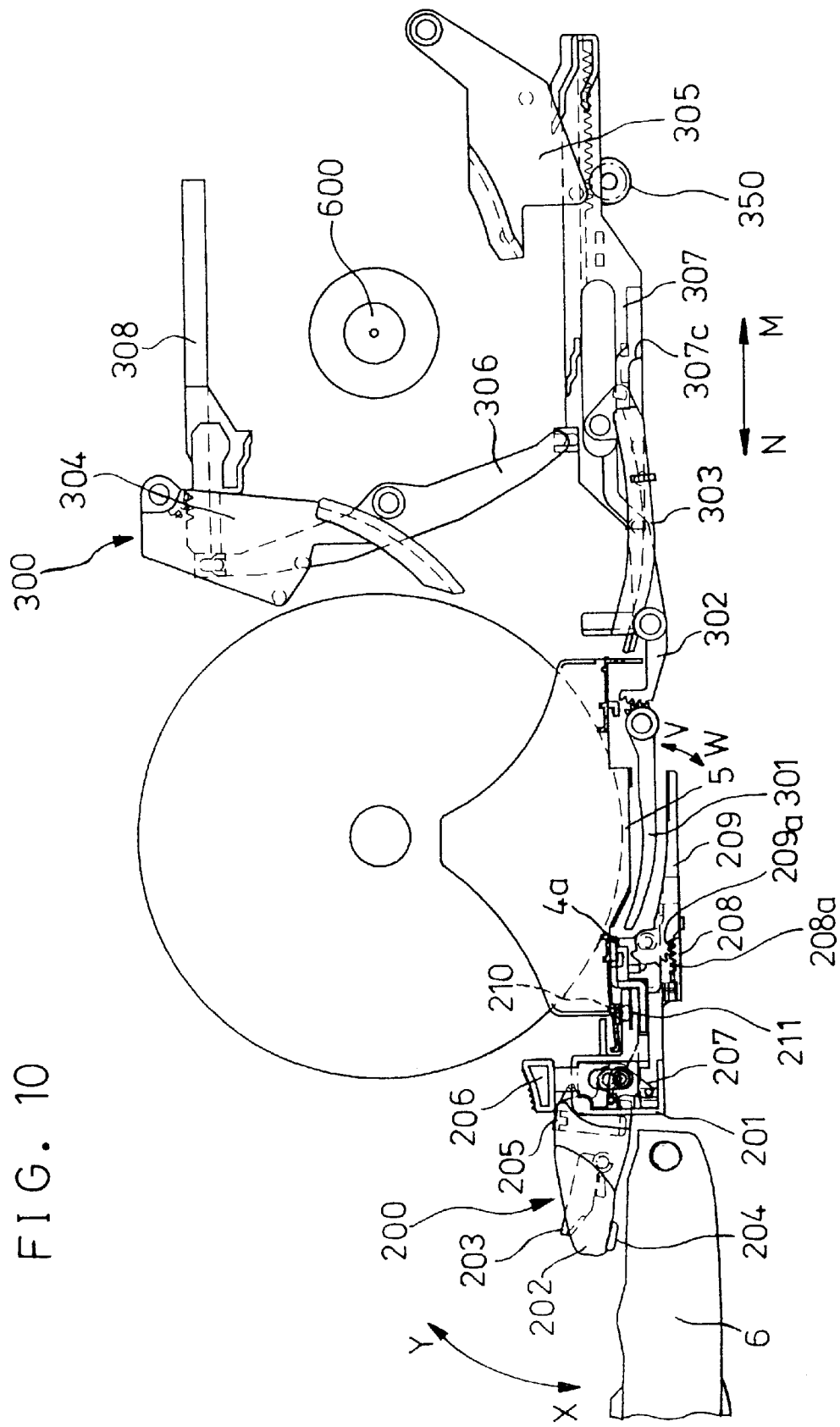
FIG. 10 is a side view showing the arrangement of the disk delivery unit and the disk reproduction unit of the first embodiment.

FIG. 10 is a side view showing an arrangement of the disk delivery unit 200 and the disk reproduction unit 300 when the front panel 6 is open.

[Transfer operation of disk reproduction unit 300]

Now, explanation will be made about the operation of transferring the disk reproduction unit 300 for mounting and returning the disk in the disk changer apparatus of the first embodiment.

After the reproduction unit 300 is transported to the position where the designated disk 7, 8 is held in the stocker tray 5 by the loading unit drive mechanism described above, the disk reproduction unit 300 transfers and mounts the designated disk 7, 8 from the stocker tray 5 to the reproduction unit. Further, after the reproduction is completed, the disk 7, 8 is returned to the stocker tray 1. This disk transfer operation will be explained with reference to FIGS. 11 to 13.

Figure 11:
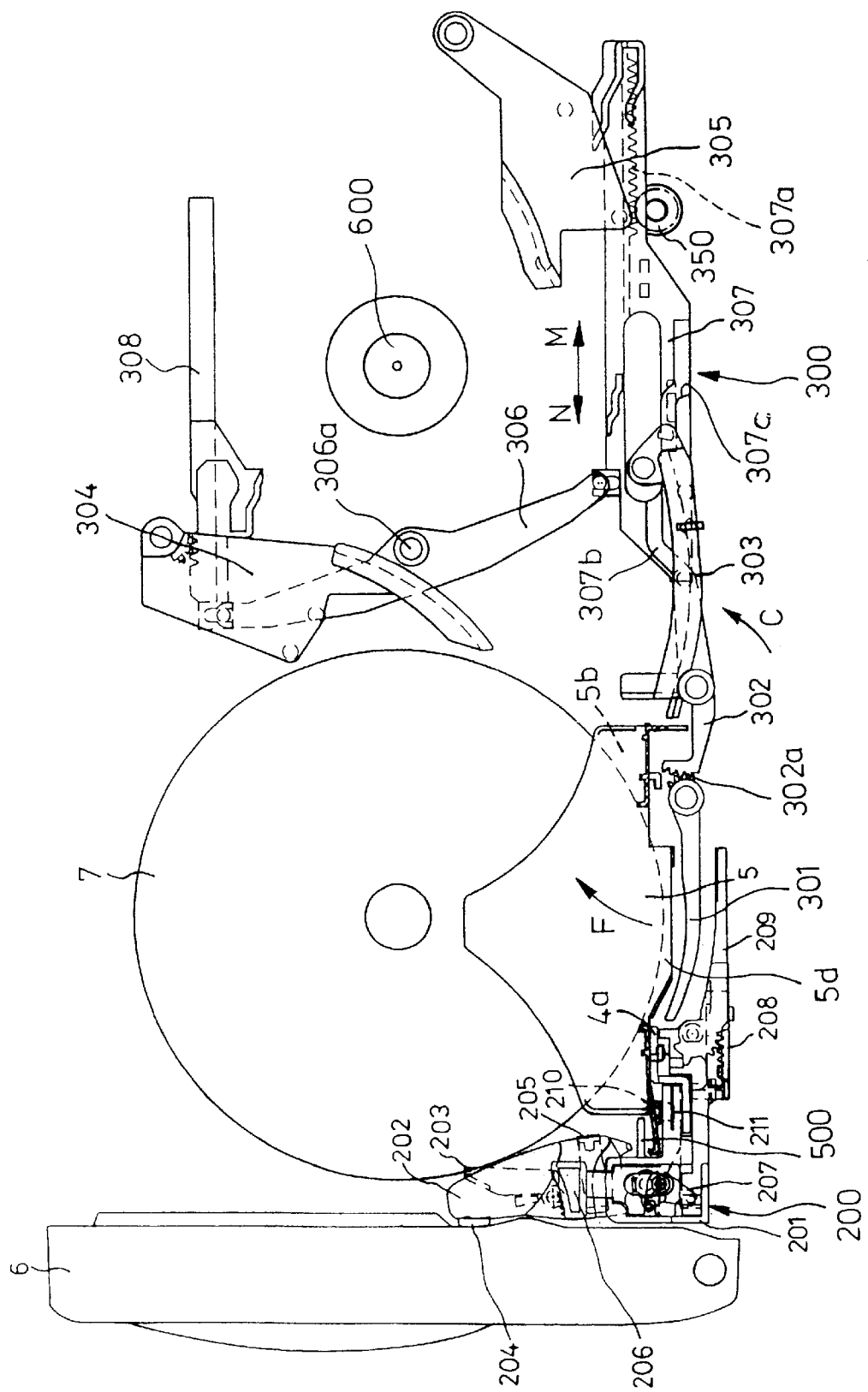
FIG. 11 is a side view for explaining the operation of the disk reproduction unit when a disk is held therein of the first embodiment.
Figure 12:
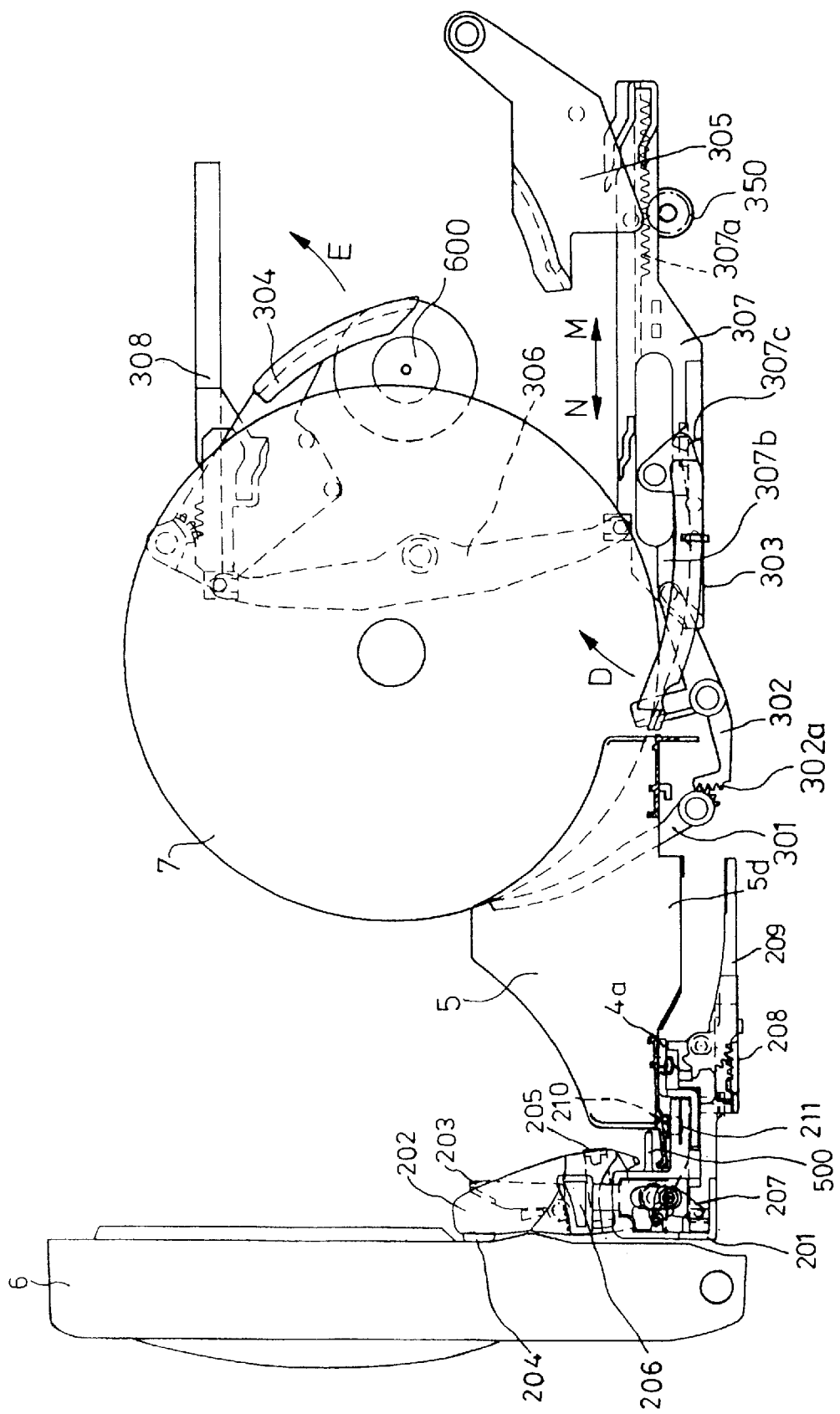
FIG. 12 is a side view for explaining the operation of the disk reproduction unit in the course of mounting a disk therein of the first embodiment.
Figure 13:
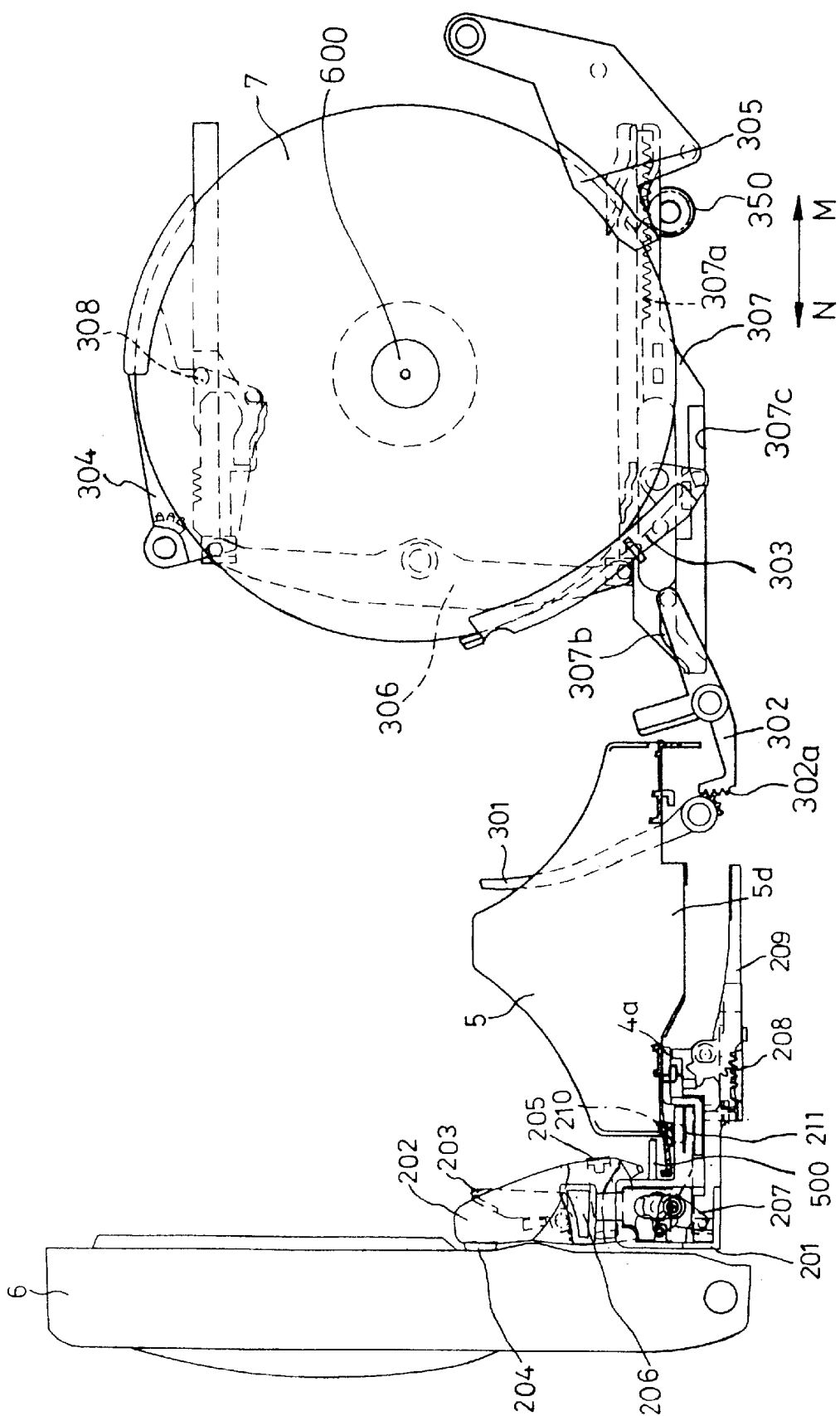
FIG. 13 is another side view for explaining the operation of the disk reproduction unit in the course of mounting a disk therein of the first embodiment.

FIG. 11 is a side view showing an arrangement of the disk transfer mechanism, etc. when a disk is held in the holding slot of the stocker tray 5. FIGS. 12 and 13 are side views showing the disk transfer operation of the disk transfer mechanism, etc. for mounting the disk. In these drawings, the disk 7, 8 is shown only as a large disk 7. A similar operation is performed on the small disk 8. Therefore, the operation will be explained with reference to the disk 7, 8.

The disk transfer mechanism includes a forward feed lever 301 for lifting the disk 7, 8 from the stocker tray 5 and transferring it rearward of the apparatus. Also, the disk transfer mechanism includes a rearward feed lever 303 for transferring the disk 7, 8 further rearward of the apparatus from the position where the disk 7, 8 is transferred by the forward feed lever 301. And further, the disk transfer mechanism has a size detection lever 305 for detecting the size of the large and small disks 7, 8 arranged in the rear part of the apparatus, and a return lever 304 for returning the disk 7, 8 to the stocker tray 5.

As shown in FIG. 11, the push-up lever 209 of the disk delivery unit 200 and the forward feed lever 301 of the disk reproduction unit 300 are arranged out of contact with each other in different vertical positions under the stocker tray 5. This configuration makes it possible for the disk delivery unit 200 and the disk reproduction unit 300 to move to an arbitrary position along the directions (shown with arrow A or B in FIG. 3) of disk arrangement without mutual interference. The disk delivery unit 200, on the other hand, is capable of taking out or exchanging a given disk other than that in reproduction.

The disk reproduction unit 300 includes a reproduction unit drive mechanism having a coupling lever 306, a lower slide plate 307 and an upper slide plate 308. The reproduction unit drive mechanism has the function of driving the reproduction unit from playback wait position to playback position. The lower slide plate 307 is in mesh with a slide plate drive gear 350 rotated by a slide plate drive motor (not shown). The lower slide plate 307 drives the reproduction unit from the playback wait position distant from the recording surface of the disk 7, 8 to the playback position in proximity to the recording surface in operatively interlocked relation with the upper slide plate 308 connected through the coupling lever 306.

The coupling lever 306 is rotatably supported on the base frame of the disk reproduction unit 300 in the central hole 306a thereof. As a result, the turning force of the slide plate drive gear 350 is imparted through the gear train 307a to the lower slide plate 307 and the upper slide plate 308, so that the lower slide plate 307 and the upper slide plate 308 slide in opposite directions.

As a result of this movement of the lower slide plate 307 forward of the apparatus (along the direction of arrow N in FIG. 11), a feed assisting lever 302 is rotated along the direction of arrow C. This rotation of the feed assisting lever 302 is generated by sliding a rear end of the feed assisting lever 302 along a cam slit 307b formed in the forward side of the lower slide plate 307. As a consequence, the feed assisting lever 302 rotates the forward feed lever 301 upward (along the direction of arrow F in FIG. 11) by means of the teeth formed at the forward end thereof. The forward feed lever 301 thus rotated advances into the holding slot 5b holding the designated disk 7, 8 from the opening 5d formed in the bottom of the stocker tray 5. As a result, the edge of the disk 7, 8 is pushed up by the forward end of the forward feed lever 301, and the disk 7, 8 in the holding slot 5b is transferred toward the reproduction unit, that is, rearward of the apparatus as shown in FIG. 12.

Further, since the lower slide plate 307 moves along the direction of arrow N, as shown in FIG. 12, the rearward feed lever 303 in mesh with the cam slit 307c of the lower slide plate 307 rotates along the direction of arrow D thereby to transfer the disk 7, 8 further rearward of the apparatus. In this transfer operation, the coupling lever 306 moves the upper slide plate 308 rearward of the apparatus (along the direction of arrow M in FIG. 12), and the upper slide plate 308 rotates the return lever 304 along the direction of arrow E. As a result of this rotation, the return lever 304 moves to a position not affecting the mounting operation of the disk 7, 8.

As described above, the transferred disk 7, 8, as shown in FIG. 13, is retained in clamping position (playback position) by being held between the edges of the rearward feed lever 303, the return lever 304 and the size detection lever 305. After that, the lower slide plate 307 and upper slide plate 308 further move (along the directions of arrows N and M in FIG. 13) thereby to drive the rearward feed lever 303, the return lever 304 and the size detection lever 305 to be slightly away from the outer edge of the disk 7, 8. As a result, the disk 7, 8 is now held only by a rotatable clamp (not shown) and a turn table 600 of the reproduction unit.

As shown in FIG. 13, when a the 12-cm CD (compact disc) as the large disk 7 is mounted on the reproduction unit, the size detection lever 305 is rotated since the size detection lever 305 is pressed by the edge of the large disk 7. When an 8-cm CD as the small disk 8 is mounted on the reproduction unit, on the other hand, the size detection lever 305 does not touch the edge of the small disk 8. The size detection lever 305, therefore, is not rotated but remains in an initial position. In this operation, the disk changer apparatus of the first embodiment arranges the large and small disks 7, 8 to be reproduced in a proper clamping position (playback position) according to their respective sizes.

The disk 7, 8 transferred to the clamping position (playback position) is reproduced while being held only by the turn table of the reproduction unit and a rotatable damper (not shown). The disk 7, 8, after complete reproduction, is returned to a predetermined position in the stocker tray 5 by the returning operation which is reverse to the above-mentioned mounting operation.

[Delivery operation of disk delivery unit 200]

Figure 14:
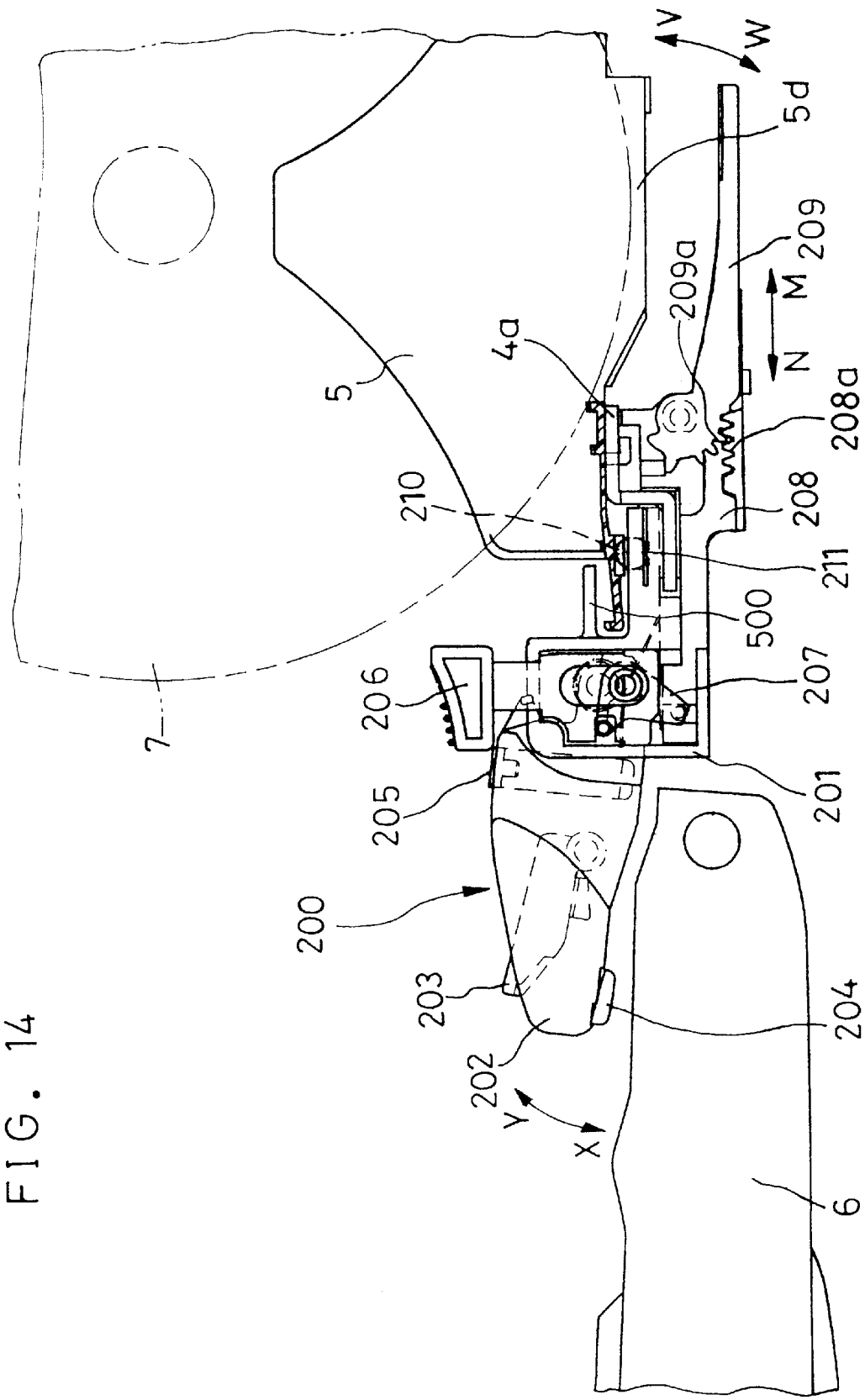
FIG. 14 is a side view for explaining the operation of the disk delivery unit with a disk held therein.
Figure 15:
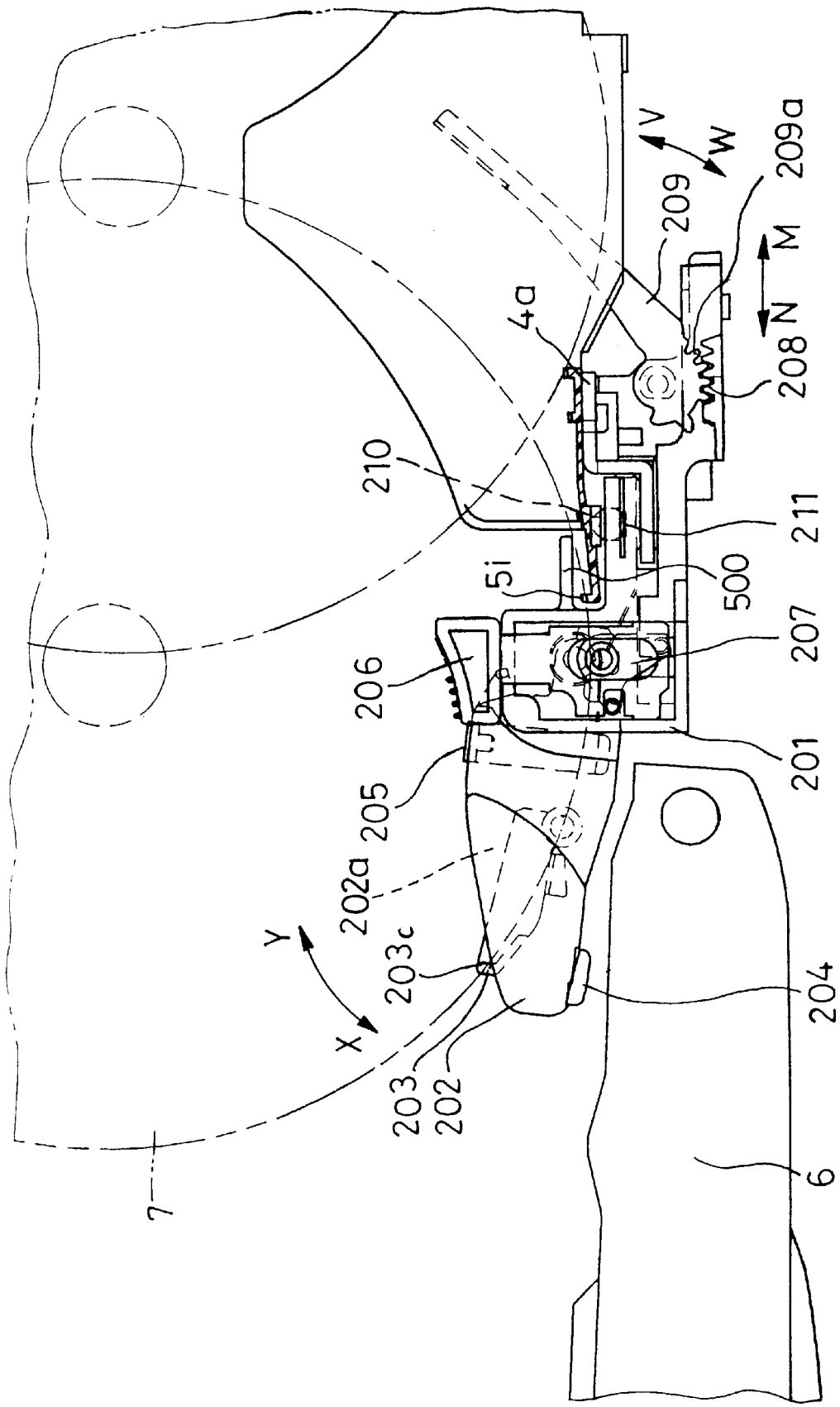
FIG. 15 is a side view for explaining the disk delivery unit in the course of taking out a disk of the first embodiment.
Figure 16:
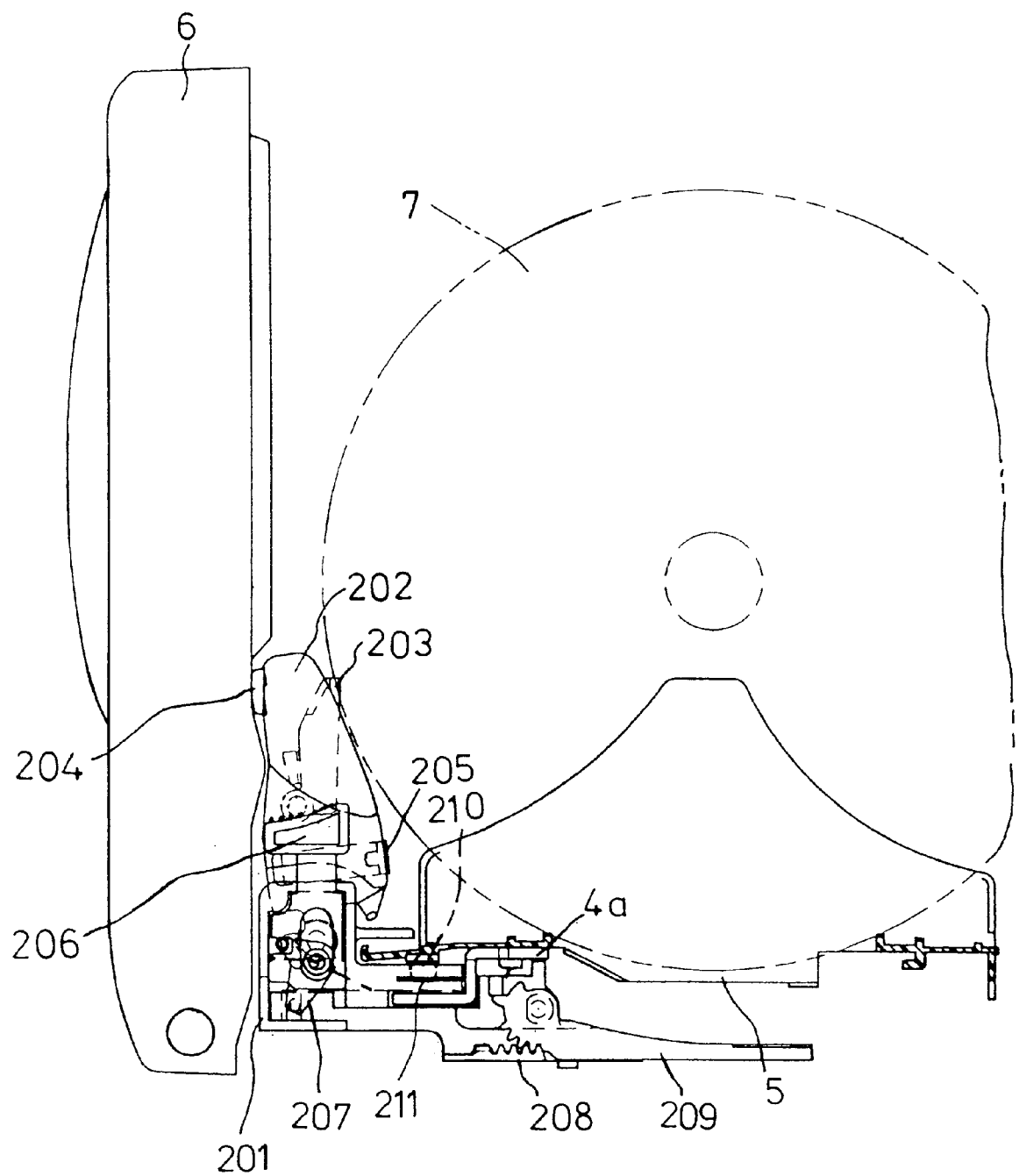
FIG. 16 is a side view for explaining the operation of the disk delivery unit with the front panel closed of the first embodiment.

Next, the operation of delivering the disk 7, 8 held in the stocker tray 5 will be explained with reference to FIGS. 14 to 16. FIGS. 14 to 16 are side views schematically showing a configuration of the disk delivery unit 200. In FIGS. 14 to 16, the disk reproduction unit 300 is not shown. FIGS. 14 and 15 show the apparatus in which the front panel 6 rotatably mounted on the front of the apparatus is open, and FIG. 16 shows the apparatus with the front panel 6 closed.

When the user presses down the eject button 206, the eject button 206 moves down along the wall surface of the eject base 201. As a result of this movement, as described above, the intermediate lever 207 rotates so that the eject slide plate 208 moves rearward of the apparatus (along the direction of arrow M in FIG. 14). As shown in FIG. 14, the eject slide plate 208 is formed to have the rack 208a which is in mesh with a gear teeth 209a formed at the front end of the push-up lever 209. By the movement of the eject slide plate 208, the push-up lever 209 rotates along the direction of arrow V due to the engagement between the rack 208a and the gear teeth 209a. As a result, the push-up lever 209 advances into the holding slot 5b holding the disk 7, 8 from the opening 5d formed in the central portion of the coupler 5c of the stocker tray 5. By the advancement of the push-up lever 209 into the holding slot 5b, the forward end of the push-up lever 209 presses the edge of the disk 7, 8 and thus transfers the disk 7, 8 forward of the apparatus (along the direction of arrow N in FIG. 14).

As shown in FIG. 15, the disk 7, 8 transferred forward of the apparatus passes through the groove 202a formed in the central portion of the eject lever 202. And the disk 7, 8 comes to stop as the edge thereof comes into contact with a support member 203c of the disk receiving lever 203. In this operation, the edge of the disk 7, 8 is supported on the support edge 5i formed at the front end of the number indication plate 5h and the support member 203c. As a result, the disk receiving lever 203 holds the disk 7, 8 at a position capable of grasping it by the central portion thereof, as described above. Also, since the forward end of the disk receiving lever 203 is set at a high position, the disk 7, 8 (especially, the small disk, i.e., the 8-cm CD) is prevented from jumping out when the eject button 206 is pressed strongly. The eject lever 202 is kept urged along the direction of arrow X by an eject lever spring (not shown) wound on the rotative shaft of the eject lever 202.

When the front panel 6 is opened or closed, the reverse side (the surface located within the apparatus) of the front panel 6 comes into contact with the supporter 204 arranged in the vicinity of the forward end of the eject lever 202. In the movements of the front panel 6, the front panel 6 presses the supporter 204 and rotates the eject lever 202 against the driving force of the eject lever spring. As a result, when the front panel 6 is opened, as shown in FIGS. 14 and 15, the eject lever 202 projects forward of the apparatus. When the front panel 6 is closed, on the other hand, as shown in FIG. 16, the eject lever 202 is substantially in upright position and is accommodated within the apparatus.

According to the first embodiment having the above-mentioned configuration, when the disk 7, 8 is taken out by opening the front panel 6, no special operation is required for taking out the eject lever 202, thereby facilitating the operation of taking out the disk 7, 8.

Further, according to the disk changer apparatus of the first embodiment, there is no need of providing a place in the front panel or the like so as to receive the disk 7, 8 taken out on the front of the apparatus, thereby reducing the size of the apparatus.

As described above, every time the front panel 6 is opened or closed, the front panel 6 and the eject lever 202 come into contact with each other. In order to prevent the front panel 6 from being damaged, therefore, the contact portion of the eject lever 202 is provided with a supporter 204 superior in slidability. Although resin is used as the material of this supporter 204 according to the first embodiment, a soft material such as felt may be used with equal effect without departing from the spirit of the present invention.

Figure 17:
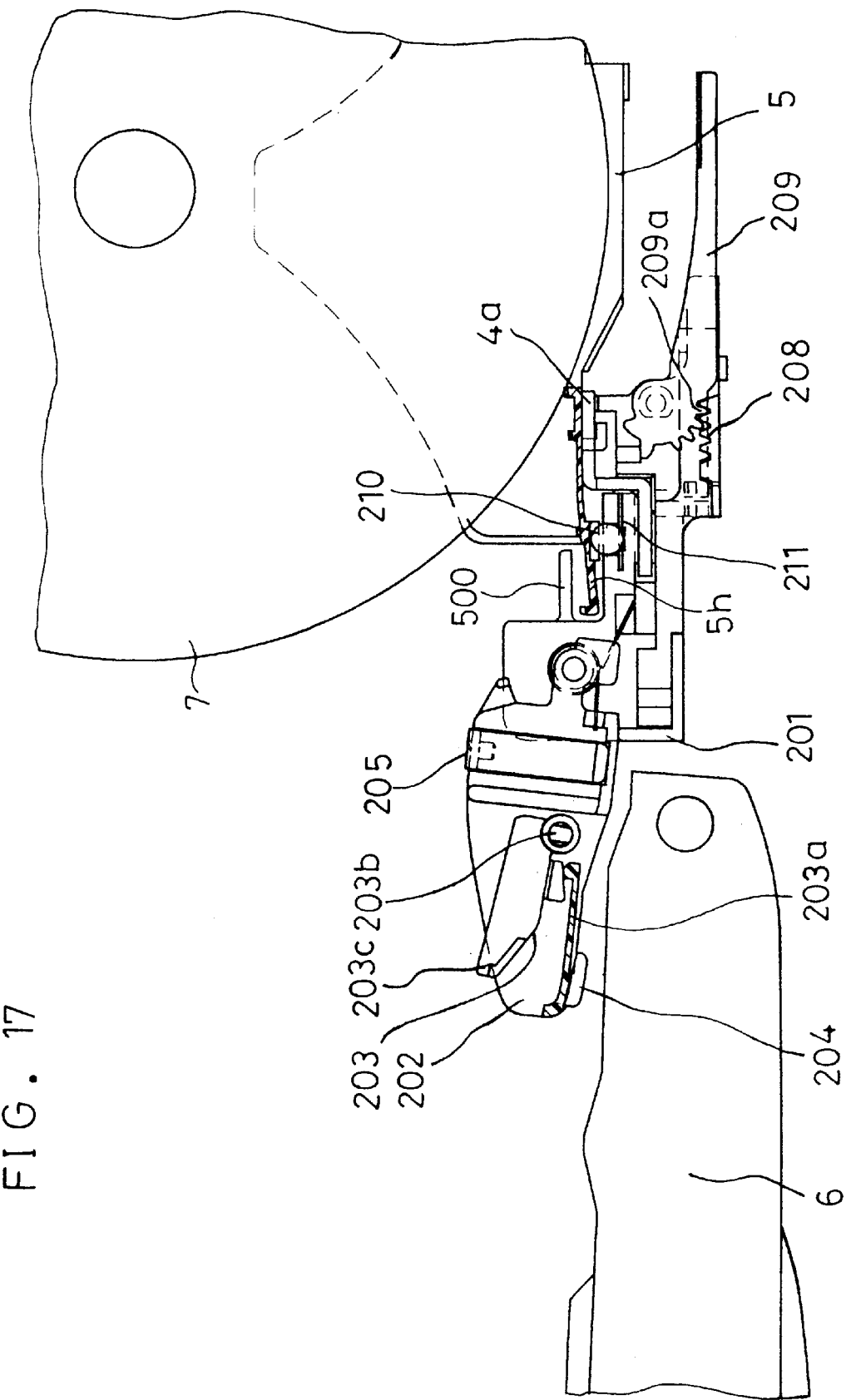
FIG. 17 is a side sectional view showing the disk delivery unit of the first embodiment.

FIG. 17 is a side sectional view showing the disk receiving lever 203 and the like arranged in the groove 202a of the eject lever 202. In FIG. 17, the above-mentioned disk reproduction unit 300 is not shown. As shown in FIG. 17, the eject lever 202 is provided with a resin spring 203a (hatched in FIG. 17). When the disk receiving lever 203 rotates about the shaft 203b by the delivery pressure of the disk 7, 8, the disk receiving lever 203 moves to have elastic property. Therefore, when the disk 7, 8 comes into contact with the disk receiving lever 203 for delivery operation, the shock by the disk 7, 8 is relaxed, so that the disk 7, 8 is securely held by the disk receiving lever 203. The disk changer apparatus of the first embodiment thus has the function of preventing the disk 7, 8 from jumping out.

As described above, according to the first embodiment, a guide member for guiding the movement of the disk delivery unit 200 serves as the rests 4a, 4b of the stocker tray 5. Even in the case where a disk changer apparatus is configured of a plurality of stocker trays 5 in combination, therefore, it is not necessary to change the configuration of the disk delivery unit 200 or to provide a guide member anew. The disk changer apparatus of the first embodiment, therefore, can readily accommodate a specification change.

Also, the forward feed lever 301 for transferring the disk 7, 8 to the reproduction unit and the push-up lever 209 of the disk delivery unit 200 are arranged at different vertical positions in order for the levers 301 and 209 not to come into contact with each other. Therefore, in the disk changer apparatus of the first embodiment, any disks 7, 8 other than the disk in reproduction can be taken out or exchanged.

Also, the disk receiving lever 203 is provided on the disk delivery unit 200 for receiving and holding the disk 7, 8 taken out. As a result, the disk 7, 8 taken out can be held accurately under any movements of the disk delivery unit 200. Consequently, there is no need of providing a mechanism for receiving and holding the disk 7, 8 in the front panel 6 or the frame unit. The disk changer apparatus of the first embodiment, therefore, is simple in structure and small in size.

Further, according to the first embodiment, elasticity is attached to the disk receiving lever 203 providing as a disk receiving means by using a spring or the like, thereby positively preventing the disk 7, 8 from jumping out.

Furthermore, according to the first embodiment, the front panel 6 is operatively interlocked with the disk receiving means. It is therefore not necessary to rotate the disk receiving means each time the front panel 6 is opened, thereby simplifying the disk delivery operation.

Further, since the disk changer apparatus of the first embodiment has the aforementioned positioning mechanism shown in FIG. 5 on the disk delivery unit 200, the disk changer apparatus makes accurate and facilitates the positioning of the disk delivery unit 200 when the disk delivery unit 200 is moved along the direction of disk arrangement. Also, this configuration makes possible accurate delivery and exchange of the disk 7, 8.

The disk changer apparatus of the first embodiment is configured to indicate the disk holding position of the stocker tray 5 by numeral and the position of the disk delivery unit 200 by using the numeral representing the disk holding position. Therefore, the position of the disks 7, 8 and the position of the disk delivery unit 200 can be easily and accurately known. Also, according to the disk changer apparatus of the first embodiment, the disk 7, 8 can be easily taken out or exchanged by checking the numeral indicated.

Furthermore, in the disk changer apparatus of the first embodiment, the disk receiving lever 203 is arranged at a minimum projected position for holding the disk 7, 8, which is taken out by the disk delivery unit 200. Therefore, the disk changer apparatus reduces the minimum space required for operating the apparatus.

Apart from the disk changer apparatus of the first embodiment wherein the resin spring 203a as a part of the eject lever 202 is provided for securing the restitutive power of the disk receiving lever 203, a modified embodiment may be such that a torsion spring having an elasticity is used instead of the resin spring with equal effect.

Second Embodiment

A disk changer apparatus of a second embodiment in accordance with the present invention will be described below with reference to the drawings. The component parts of the second embodiment having the same configuration and effect as the corresponding parts of the first embodiment are designated by the same reference numerals respectively and will not be described again.

Figure 18:
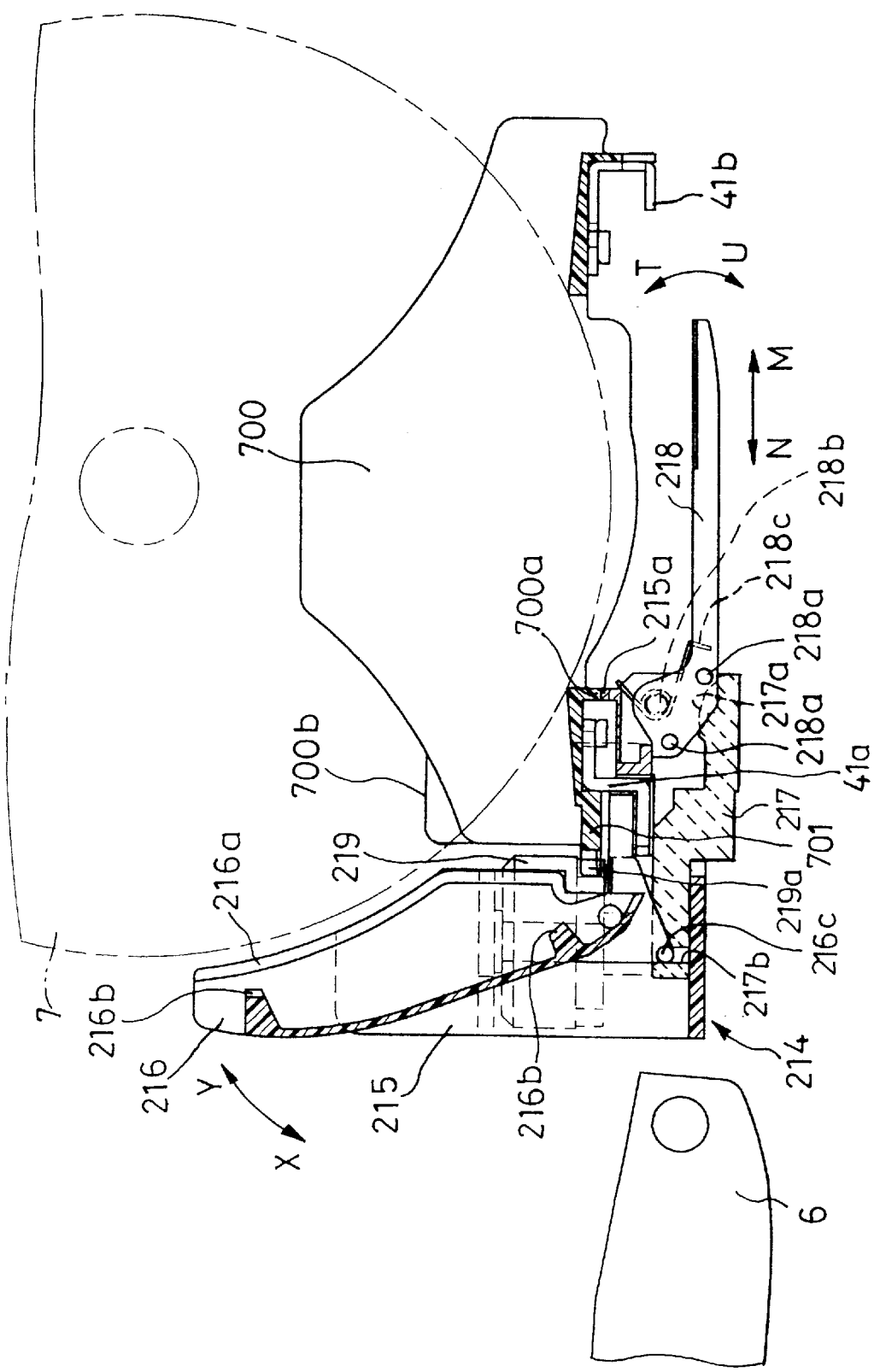
FIG. 18 is a side sectional view showing the disk delivery unit of a disk changer apparatus of a second embodiment in accordance with the present invention.
Figure 19:
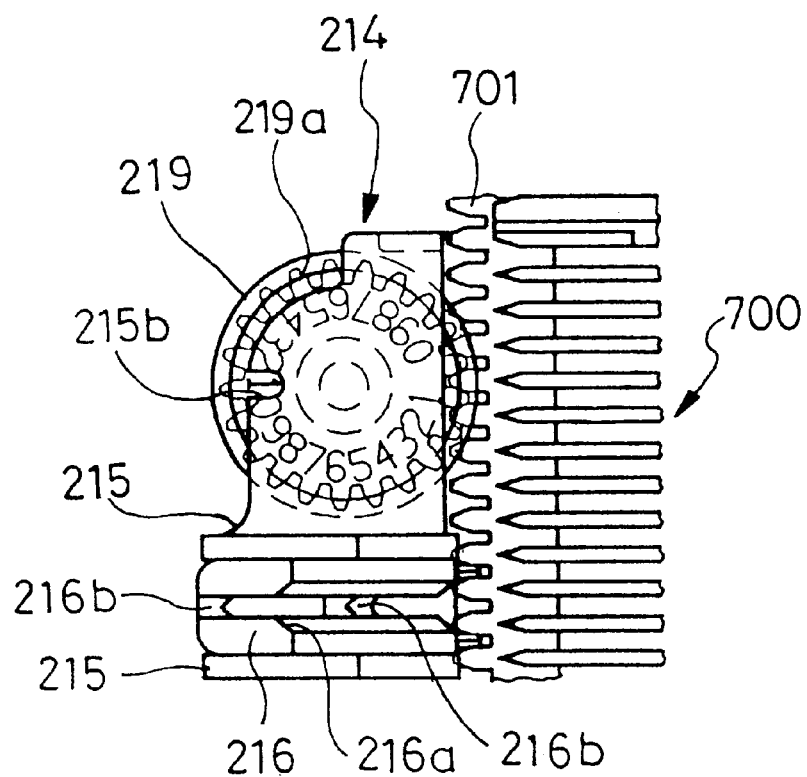
FIG. 19 is a partially enlarged plan view showing the disk delivery unit of the second embodiment.

FIG. 18 is a side sectional view showing the configuration of the disk delivery unit 214 of the disk changer apparatus of the second embodiment. FIG. 19 is a plan view showing a part of the disk delivery unit 214 of FIG. 18. The disk changer apparatus of the second embodiment comprises the disk reproduction unit 300 described with reference to the first embodiment. The disk reproduction unit 300, however, is not shown in FIGS. 18 and 21.

Although the first embodiment is such that the disk 7, 8 is taken out by pressing the eject button 206, the disk changer apparatus of the second embodiment is so configured that the disk 7, 8 is taken out by rotating an eject lever 216.

Also, the disk delivery unit 214 of the second embodiment includes a position indication counter mechanism of rotary type for indicating the position of the disk delivery unit 214.

[Disk delivery unit 214]

FIG. 18 is a side sectional view showing the disk delivery unit 214 arranged on the front of the apparatus. The disk delivery unit 214 shown in FIG. 18 has a front panel 61 thereof open. In FIG. 18, a stocker tray 700 for holding the disks 7, 8 is fixedly held by rests 41a, 41b. The eject lever 216, which is rotatably held on the eject base 215, is normally held upright by the operation of a spring (not shown) regardless of whether the front panel 6 is opened or closed, as shown in FIG. 18. An eject slide plate 217 shadowed with broken lines in FIG. 18 is provided to move by a predetermined distance along the direction of arrow N or M. A pin 216c formed at an end of the eject slide plate 217 is in mesh with an engaging groove 217b formed in the eject slide plate 217. As a result, by the rotation of the eject lever 216 along the direction of arrow X, the eject slide plate 217 moves along the direction of arrow M. A push-up lever 218 (made by SUS, 0.8 mm thick) arranged behind the eject slide plate 217 is held rotatably about a shaft 218b on an eject base 215. An inclined surface 217a formed at the rear end of the eject slide plate 217 is in mesh with the pin 218a arranged on the push-up lever 218. Consequently, the push-up lever 218 rotates along the direction of arrow T by the movement of the eject slide plate 217 along -the direction of arrow M.

Also, when the eject lever 216 rotates along the direction of arrow Y under the driving force of a spring (not shown), the eject slide plate 217 moves along the direction of arrow N, so that the push-up lever 218 rotates along the direction of arrow U. The push-up lever 218 is kept urged along the direction of arrow U by a spring 218c. When the eject lever 216 is positioned upright, therefore, the push-up lever 218 is located under the stocker tray 700.

As shown in FIG. 19, a counter 219 indicating the position of the disk delivery unit 214 is juxtaposed with the eject lever 216. The counter 219 has a cylindrical form with a vertical axis, and is held on the eject base 215 rotatably about the same axis.

As shown in FIG. 18, the disk delivery unit 214 is held by engaging between the eject base 215 and the bent portion of the forward rest 41a. And the disk delivery unit 214 is provided to move laterally of the apparatus (in the direction of disk arrangement) to an arbitrary position while being held on the rest 41a. In order to set the disk delivery unit 215 in an appropriate position on the stocker tray 700, the portion of the eject base 215 engaging with the stocker tray 700 is formed with a triangular protrusion 215a having the elasticity of resin.

Figure 20:
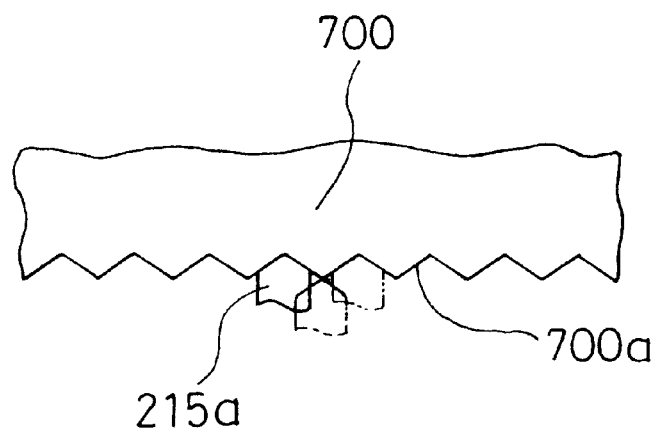
FIG. 20 is a schematic diagram showing the positioning mechanism of the disk delivery unit of the second embodiment.

FIG. 20 is a schematic diagram showing the triangular protrusion 215a of the eject base 215 in mesh with one of triangular grooves 700a formed in the stocker tray 700 in FIG. 18. As shown in FIG. 20, the center of each of the triangular grooves 700a formed on the stocker tray 700 coincides with the center of the corresponding one of the slots for holding the disks 7, 8. The triangular grooves 700a are formed equidistantly. Also, the protrusion 215a of the eject base 215 is kept pressed against the triangular grooves 700a of the stocker tray 700 by the elastic force of resin. When the disk delivery unit 214 moves along the direction of disk arrangement, the protrusion 215a of the eject base 215 engages with the triangular grooves 700a sequentially and therefore the disk delivery unit 214 is accurately set (corrected) in position with respect to each slot holding the disk 7, 8.

As shown in FIGS. 18 and 19, a groove 216a for supporting the disk 7, 8 delivered from the stocker tray 700 is formed at the central portion of the eject lever 216 along the longitudinal direction of the eject lever 216. The bottom of the groove 216a is formed with another two V-shaped grooves 216b (FIG. 18) thereby supporting accurately the disk 7, 8 delivered.

As shown in FIG. 19, a rack 701 is formed along the direction of disk arrangement on the front of the stocker tray 700. Also, gear teeth 219a adapted to engage with the rack 701 are formed on the counter 219. The gear arrangements of the second embodiment are so configured that the counter 219 makes one rotation when the disk delivery unit 214 moves along the direction of disk arrangement and has passed through 21 disk holding slots of the stocker tray 700. In the stocker tray 700 of the second embodiment, one out of every 20 holding slots is not in use, and therefore each 21 disk holding slots can hold 20 disks.

As shown in FIG. 19, two continuous strings of numerals 0 to 9 are marked along the circumference on the upper surface of the counter 219. The counter 219 rotates by an angle equivalent to one numeral each time the disk delivery unit 214 moves to cover one holding slot of the stocker tray 700. Also, the stocker tray 700 is provided with a tall partitioning plate 700b at intervals of ten holding slots on the stocker tray 700 in order to help the user readily recognize the number and position of the disks 7, 8 held in the holding slots.

Further, the eject base 215 is provided with an indicator 215b. The indicator 215b is configured to indicate one numeral representing the position of the disk delivery unit 214 corresponding to the stocker tray 700 among a plurality of the numerals marked on the upper surface of the counter 219. According to the second embodiment, the user can easily and accurately recognize the position of the disk delivery unit 214 in motion by using the numerals indicated on the indicator 215a and the tall partitioning plates 700b for each ten holding slots of the stocker tray 700.

Furthermore, the operating unit of the counter 219 is arranged on the eject base 215 on the front of the apparatus, and therefore the user can easily manipulate it. The user can adjust the position of the disk delivery unit 214 by rotating the counter 219.

[Delivery operation of disk delivery unit 214]

Next, explanation will be made about the operation of delivering the disk 7, 8 in the disk changer apparatus of the second embodiment.

In FIG. 18, the eject lever 216 positioned upright is tilted by rotation forward of the apparatus (along the direction of arrow X in FIG. 18), so that the eject slide plate 217 moves rearward of the apparatus (along the direction of arrow M in FIG. 18). By the movement of the eject slide plate 217 along the direction of arrow M, the inclined surface 217a formed on the upper rear end surface of the eject slide plate 217 pushes up the pin 218a of the push-up lever 218. As a result, the push-up lever 218 rotates along the direction of arrow T. The push-up lever 218 thus rotated in the direction of arrow T advances into a slot holding the disk 7, 8 through the opening formed in the central portion of the coupler of the stocker tray 700. Consequently, the forward end of the push-up lever 218 pushes the edge of the disk 7, 8 to transfer the disk 7, 8 forward of the apparatus (along the direction of arrow N in FIG. 18). The disk 7, 8 thus sent forward of the apparatus stops as it is retained in the groove 216a formed in the central portion of the eject lever 216. This state is shown in FIG. 21, which is a side sectional view showing the disk delivery unit 214 in the disk delivering operation of the disk 7, 8.

Although the second embodiment uses the rotatable eject lever 216 as the disk receiving means, the disk changer apparatus in accordance with the present invention may alternatively be configured in such a manner that the eject lever 216 is not adapted to rotate but slide to move the disk 7, 8 to the delivery point.

Also, instead of a separate elastic material used to provide elasticity to the eject lever 216 in the second embodiment, the eject lever itself may be formed of an elastic material to receive a disk.

Since the disk changer apparatus of the second embodiment is configured as described above, a specific disk 7, 8 alone can be taken out or exchanged both easily and accurately by moving the disk delivery unit 214 along the direction in which the disks are arranged. Especially, even in the case where the disks 7, 8 are closely held in the stocker tray 700 or even in the case where a small disk 8 is sandwiched between large disks 7, the disk changer apparatus of the second embodiment allows the small disk 8 to be taken out or exchanged easily.

According to the second embodiment, the push-up lever is driven by rotating the eject lever 216 as a disk receiving unit, and therefore no independent operating means is required for manipulating the push-up lever, thereby simplifying the apparatus.

Also, according to the second embodiment, the counter 219 having numerals for indicating the disk position is provided on the disk delivery unit 214, so that the current position of the disk delivery unit 214 can be easily recognized.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A disk changer apparatus comprising:

a stocker tray including a plurality of partitioning plates arranged substantially in parallel at predetermined spatial intervals and a coupler for coupling said partitioning plates so as to have an opening at least in a part of a bottom thereof, said stocker tray being adapted to hold each of a plurality of disks between adjacent ones of said partitioning plates; and a disk delivery unit including a push-up lever which is adapted to advance into a partition between said partitioning plates from said opening formed in said coupler, and which delivers the disk from said stocker tray to outside the apparatus, an eject unit which drives said push-up lever to eject the disk from said stocker tray to outside the apparatus, and a disk receiving unit for supporting the disk taken out from said stocker tray, said disk delivery unit being movable along the direction in which said disks are arranged in said stocker tray, said disk receiving unit being configured to rotate in operatively interlocked relationship with a front panel for opening or closing an exterior case with the front thereof open.

2. A disk changer apparatus in accordance with claim 1, further comprising:

a disk reproduction unit movable along the direction of disk arrangement in said stocker tray for selectively reproducing any one of a plurality of disks held in said stocker tray;

wherein said disk reproduction unit includes a lever adapted to advance into a partition between said partitioning plates from said opening formed in said coupler of said stocker tray and thereby to move said disk into the apparatus, said lever being arranged to move separately in parallel with said push-up lever above or below said push-up lever under said stocker tray.

3. A disk changer apparatus in accordance with claim 1, further comprising a positioning mechanism for setting said disk delivery unit in a position with respect to a corresponding position of said stocker tray holding each of said disks.

* * * * *